United States Patent
Salkintzis

(10) Patent No.: US 11,350,278 B2
(45) Date of Patent: *May 31, 2022

(54) CORE NETWORK ATTACHMENT THROUGH STANDALONE NON-3GPP ACCESS NETWORKS

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/176,091

(22) Filed: Feb. 15, 2021

(65) Prior Publication Data

US 2021/0185532 A1 Jun. 17, 2021

Related U.S. Application Data

(63) Continuation of application No. 16/330,058, filed as application No. PCT/EP2016/073819 on Oct. 5, 2016, now Pat. No. 10,924,930.

(51) Int. Cl.
*H04W 12/069* (2021.01)
*H04W 12/106* (2021.01)
(Continued)

(52) U.S. Cl.
CPC ......... *H04W 12/069* (2021.01); *H04L 63/166* (2013.01); *H04W 12/0431* (2021.01);
(Continued)

(58) Field of Classification Search
CPC ....... H04W 12/0609; H04W 12/04031; H04W 12/1006; H04W 12/06; H04L 63/166
See application file for complete search history.

(56) References Cited

U.S. PATENT DOCUMENTS

2008/0181178 A1  7/2008  Shaheen
2010/0056106 A1  3/2010  Korhonen et al.
(Continued)

FOREIGN PATENT DOCUMENTS

EP    1424810 A1    11/2002

OTHER PUBLICATIONS

G. M. Keien et al., "Security Aspects of 3G-WLAN Interworking", IEEE Communications Magazine, Nov. 2003, pp. 82-88.
(Continued)

*Primary Examiner* — Ernest G Tacsik
(74) *Attorney, Agent, or Firm* — Kunzler Bean & Adamson

(57) ABSTRACT

One apparatus includes a processor that creates a second request on behalf of a remote unit from a first request received from a non-3GPP access network, the second request including a subscriber identity of the remote unit. The processor sends the second request to a mobile core to initiate connection of the remote unit to the mobile core and receives a third request from the mobile core, the first request being part of a first authentication procedure and the third request being part of a NAS authentication procedure different than the first authentication procedure. The processor transforms the third request into a fourth request of the first authentication procedure and uses an authentication response of the first authentication procedure to complete connection of the remote unit to the mobile core.

20 Claims, 10 Drawing Sheets

(51) Int. Cl.
  *H04W 12/0431* (2021.01)
  *H04L 9/40* (2022.01)
  *H04W 92/02* (2009.01)
  *H04W 84/12* (2009.01)
  *H04W 88/06* (2009.01)

(52) U.S. Cl.
  CPC ......... *H04W 12/106* (2021.01); *H04L 63/162* (2013.01); *H04W 84/12* (2013.01); *H04W 88/06* (2013.01); *H04W 92/02* (2013.01)

(56) References Cited

U.S. PATENT DOCUMENTS

| | | |
|---|---|---|
| 2013/0031271 A1 | 1/2013 | Bosch et al. |
| 2013/0203381 A1 | 8/2013 | Takahashi et al. |
| 2014/0093071 A1 | 4/2014 | Qiang |
| 2014/0351592 A1 | 11/2014 | Starsinic et al. |
| 2016/0295405 A1 | 10/2016 | Roeland et al. |
| 2018/0184297 A1 | 6/2018 | Mohamed et al. |

OTHER PUBLICATIONS

3GPP, "3rd Generation Partnership Project; Technical Specification Group Services and System Aspects; Study on Architecture for Next Generation System (Release 14)", 3GPP TR 23.799 V1.0.2, Sep. 2016, pp. 1-423.

CORE NETWORK ATTACHMENT THROUGH STANDALONE NON-3GPP ACCESS NETWORKS

CROSS-REFERENCE TO RELATED APPLICATIONS

This is a continuation application of and claims priority to U.S. patent application Ser. No. 16/330,058 entitled "CORE NETWORK ATTACHMENT THROUGH STANDALONE NON-3GPP ACCESS NETWORKS" and filed on Mar. 1, 2019 for Apostolis Salkintzis, which is incorporated herein by reference, which application claims priority to International Patent Application Number PCT/EP2016/073819 entitled "CORE NETWORK ATTACHMENT THROUGH STANDALONE NON-3GPP ACCESS NETWORKS" and filed on Oct. 5, 2016 for Apostolis Salkintzis, which is also incorporated herein by reference.

FIELD

The subject matter disclosed herein relates generally to wireless communications and more particularly relates to attaching a remote unit to a mobile core network via a standalone non-3GPP access network.

BACKGROUND

The following abbreviations are herewith defined, at least some of which are referred to within the following description.

3GPP Third Generation Partnership Project
4G Fourth Generation
5G Fifth Generation
AAA Authentication Authorization and Accounting
ANDSF Access Network Discovery and Selection Function
AP Access Point
CP Control Plane
DL Downlink
DTLS Datagram Transport Level Security
EAP Extensible Authentication Protocol
EAP-AKA Extensible Authentication Protocol for 3rd Generation Authentication and Key Agreement
EAP-AKA' Improved Extensible Authentication Protocol for 3rd Generation Authentication and Key Agreement
EAPoL Extensible Authentication Protocol over LAN
eNB Evolved Node B
EPC Evolved Packet Core
ePDG Enhanced Packet Data Gateway
ESSID Extended Service Set Identification
E-UTRAN Evolved Universal Terrestrial Radio Access
HSS Home Subscriber Server
IKEv2 Internet Key Exchange version 2
LAN Local Area Network
LTE Long Term Evolution
MME Mobility Management Entity
NSWO Non-Seamless WLAN Offload
OFDM Orthogonal Frequency Division Multiplexing
PCRF Policy and Charging Rules Function
PDN Packet Data Network
PGW Packet Data Network Gateway
PLMN Public Land Mobile Network
RAN Radio Access Network
SC-FDMA Single Carrier Frequency Division Multiple Access
SGW Serving Gateway
TWAG Trusted Wireless Access Gateway
UE User Entity/Equipment (Mobile Terminal)
UL Uplink
UP User Plane
WiMAX Worldwide Interoperability for Microwave Access
WLAN Wireless Local Area Network Currently, mobile communication networks following the Long Term Evolution ("LTE") architecture support several different interfaces between an Access Network ("AN") and the Evolved Packet Core ("EPC") with different types of access networks use different types of interfaces. For example, the S1 interface is used only between an Evolved Universal Terrestrial Radio Access ("E-UTRAN") and EPC. As another example, wireless local area network ("WLAN") access to the EPC involves several other interfaces: the S2a and STa interfaces for access via trusted WLANs, the SWu and S2b interfaces for access via untrusted WLANs, and the S2c interface for access via either trusted or untrusted WLANs. In addition, new network elements have been specified for WLAN interworking, including the Authentication, Authorization, and Accounting ("AAA") server, the Evolved Packet Data Gateway ("ePDG"), the Trusted Wireless Access Gateway ("TWAG"), etc. All these different interfaces and network elements for connecting different accesses to EPC have resulted to a complex and difficult to manage architecture.

At times, a WLAN access network is integrated into the E-UTRAN in a way that requires neither new network elements in EPC nor new AN-EPC interfaces, for example using LTE-WLAN Aggregation ("LWA"). However, such kind of WLAN integration has limited deployment scenarios: the WLAN access must always be within the LTE coverage (otherwise Dual Connectivity is not feasible) and, more importantly, the WLAN access needs to be a 'special' WLAN that supports an interface with the eNB and several other enhancements. Such WLAN access is not a "standalone" WLAN. To support however interworking with standalone WLAN accesses (which account for the majority of deployment scenarios) additional, WLAN-specific network elements and interfaces are required, thus increasing the complexity of the system.

BRIEF SUMMARY

Disclosed are procedures for connecting a remote unit to a mobile core network via a non-3GPP access network. Said procedures may be implemented by apparatus, systems, methods, or computer program products.

One method of an interworking function for connecting a remote unit to a mobile core network via a non-3GPP access network includes receiving, at the interworking entity, a first authentication request from an access point in a non-3GPP access network, the first authentication request being part of a first authentication procedure and containing a subscriber identity of the remote unit. The method includes creating, by the interworking entity, a request on behalf of the remote unit, wherein the created request is not present in the first authentication request and wherein the created request includes the subscriber identity. The method includes sending, by the interworking entity, the created request to a mobile core network to initiate connection of the remote unit to the mobile core network. The method includes receiving, at an interworking entity, a second authentication request from the mobile core network, wherein the second authentication request is part of a NAS authentication procedure different than the first authentication procedure. The method includes transforming, by the interworking entity, the second authentication request into a third authentication request of the first authentication procedure. The method includes using, by the interworking entity, an authentication response of the first authentication procedure to complete connection to the mobile core network

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
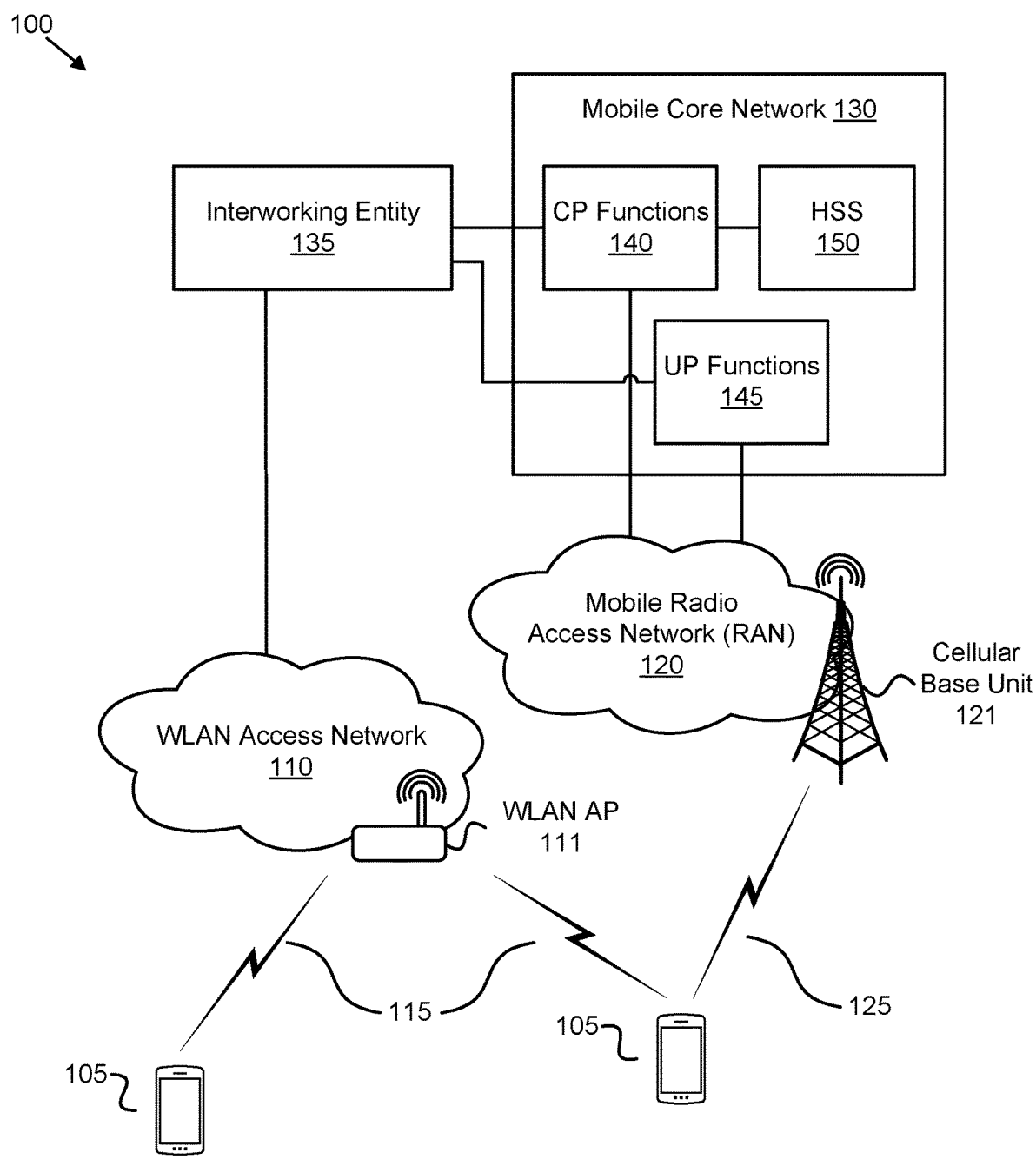
FIG. 1 is a block diagram illustrating one embodiment of a wireless communication system for connecting a remote unit to a mobile core network via a non-3GPP access network using an interworking entity.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to solve the above described problem of integrating non-3GPP access (e.g., non-E-UTRAN access) into next generation mobile communication networks (e.g., 5G networks), future wireless standards are expected to simplify the architecture and to specify a common AN-CN interface that can be used for all types of accesses including 5G RAN, WLAN, fixed broadband, satellite access, and the like. Here, all types of access network (both 3GPP and non-3GPP) communicate with the core network using the very same interfaces: a common control plane interface (referred to herein as the "NG2" interface) and a common user plane interface (referred to herein as the "NG3" interface).

To provide interworking between the non-3GPP access networks ("N3AN"), the present disclosure describes a new network element referred to as a non-3GPP interworking function ("N3IWF"). The N3IWF contains both hardware and software elements for protocol conversion and signal adaptation between the N3AN and the CN. Additionally, the N3IWF executes a 3GPP attach procedure with the CN on behalf of a UE when the UE connects to a N3AN and carries out an authentication procedure. For example, when a UE associates with a trusted WLAN and begins an EAP-AKA' authentication procedure, the N3IWF initiates a 5G attach procedure with the CN on behalf of the UE (e.g., the N3IWF acts as a proxy for the UE) while the UE continues the EAP-AKA' authentication procedure.

The N3IWF includes a functional component referred to as an Attach Proxy, which performs interworking between the authentication signaling and the 3GPP attach signaling. In doing so, the Attach Proxy acts as a UE proxy and initiates the 3GPP attach procedure on behalf of the UE. The Attach Proxy takes parameters received from the UE in an authentication procedure message and generates an attach procedure message for the CN using the received parameters. Similarly, the Attach Proxy takes parameters received from the CN in an attach procedure message and generates an authentication procedure message for the UE using the parsed parameters.

Beneficially, using the described apparatus, methods, signaling procedures, network architectures, protocol architectures, etc. does not require new authentication procedures for the N3AN. Additionally, legacy UEs may be authenticated and authorized by the 5G CN when they attach to a trusted WLAN (e.g., using EAP-AKA' authentication). In this way, legacy UEs may connect to a trusted WLAN and start Non-Seamless WLAN offload ("NSWO") traffic (i.e. traffic that traverses only the WLAN, not the 5G core network) without requiring new UE capabilities. Similarly, legacy UEs may be authenticated and authorized by the 5G CN when they establish an IKEv2/IPsec connection to the N3IWF, which is perceived as an ePDG.

As discussed in more detail below, the N3IWF supports network slice selection over non-3GPP access, i.e. enables the UE to send 'assistance information' during WLAN authentication which is used by the network to select an appropriate network slice for the UE (e.g. to select an IoT slice).

FIG. 1 a wireless communication system 100 for connecting a remote unit to a mobile core network via a non-3GPP access network using an interworking entity, according to embodiments of the disclosure. In one embodiment, the wireless communication system 100 includes remote units 105, at least one WLAN AN 110 (each WLAN AN 110 comprising one or more WLAN access points ("APs") 111), WLAN communication links 115, a mobile radio access network ("RAN") 120 (comprising one or more cellular base units 121), and cellular communication links 125. Even though a specific number of remote units 105, WLAN ANs 110, WLAN APs 111, WLAN communication links 115, mobile radio access networks 120, cellular base units 121, and cellular communication links 125 are depicted in FIG. 1, one of skill in the art will recognize that any number of remote units 105, WLAN ANs 110, WLAN APs 111, WLAN communication links 115, mobile radio access networks 120, cellular base units 121, and cellular communication links 125 may be included in the wireless communication system 100.

In one implementation, the wireless communication system 100 is compliant with a fifth generation ("5G," also referred to as "NextGen") of the 3GPP protocol, wherein the cellular base units 121 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the WLAN APs 111 via uplink ("UL") and downlink ("DL") communication signals. Furthermore, the UL and DL communication signals may be carried over the WLAN communication links 115. Similarly, the remote units 105 may communicate with one or more cellular base units 121 in the mobile radio access network 120 via UL and DL communication signals carried over the cellular communication links 125.

The WLAN ANs 110 may be distributed over a geographic region. As depicted in FIG. 1, a WLAN AN 110 connects to a mobile core network 130 via an interworking entity 135. In certain embodiments, a WLAN AN 110 may be controlled by an operator of the mobile core network 130 and may have direct access to the mobile core network 130. Such a WLAN deployment is referred to as a "trusted WLAN." A WLAN AN 110 is considered as "trusted" when it is operated by the 3GPP operator and supports certain security features, such as 3GPP-based authentication and strong air-interface encryption. In some embodiments, the interworking entity 135 may be contained within (e.g., co-sited with) a trusted WLAN. In one embodiment, the interworking entity may be a component of a WLAN AP 111 in the trusted WLAN AN 110.

In other embodiments, a WLAN AN 110 is not controlled by the operator of the mobile core network 130 and thus does not have direct access to the mobile core network 130. Such WLAN deployments are referred to as "untrusted" WLANs. Public hotspots deployed in malls, coffee shops, and other public areas are considered as untrusted. Here, the untrusted WLAN ANs 110 rely on a data network, such as the Internet, to connect to the mobile core network 130. The mobile core network 130 may provide services to a remote unit 105 via the WLAN AN 110, as described in greater detail herein.

Each WLAN AP 111 may serve a number of remote units 105 with a serving area. Typically, a serving area of the WLAN AP 111 is smaller than the serving area of a cellular base unit 121. The WLAN APs 111 may communicate directly with one or more remote units 105 by receiving UL communication signals and transmitting DL communication signals to serve the remote units 105 in the time, frequency, and/or spatial domain. Both DL and UL communication signals are carried over the WLAN communication links 115. A WLAN AP 111 may communicate using unlicensed radio spectrum.

The cellular base units 121 in the mobile radio access network 120 may be distributed over a geographic region. In certain embodiments, a cellular base unit 121 may also be referred to as an access terminal, a base, a base station, a Node-B, an eNB, a Home Node-B, a relay node, a device, or by any other terminology used in the art. The cellular base units 121 are part of a mobile radio access network ("RAN") 120 that may include one or more controllers communicably coupled to one or more corresponding cellular base units 121. These and other elements of radio access network are not illustrated but are well known generally by those having ordinary skill in the art.

The mobile radio access network 120 may serve a number of remote units 105 within a serving area, for example, a cell or a cell sector via a wireless communication link. The mobile radio access network 120 may communicate directly with one or more of the remote units 105 via communication signals. Generally, the mobile radio access network 120 transmit downlink ("DL") communication signals to serve the remote units 105 in the time, frequency, and/or spatial domain. Furthermore, the DL communication signals may be carried over the cellular communication links 125. The cellular communication links 125 may be any suitable carrier in licensed or unlicensed radio spectrum. The cellular communication links 125 may communicate with one or more of the remote units 105 and/or one or more of the cellular base units in the mobile radio access network 120.

In one embodiment, the mobile core network 130 is a 5G packet core which may be coupled to other networks, like the Internet and private data networks, among other data networks. Additionally, the mobile core network 130 may be coupled to other types of access networks, such as fixed broadband access networks, satellite access, and the like. The present disclosure is not intended to be limited to the implementation of any particular wireless communication system architecture or protocol. Thus, the mobile radio access network 120 may be coupled to any suitable next generation (e.g., 5G) packet core network.

Each mobile core network 130 belongs to a single public land mobile network ("PLMN"). The mobile core network 130 includes at least one control plane ("CP") function, depicted here as CP functions 140. While the mobile core network 130 may include a plurality of CP functions 140, the disclosed procedures may only require the involvement of one CP function (e.g., network entity) from the plurality of CP functions 140. As depicted, the mobile core network 130 also includes at least one user plane ("UP") function, depicted here as UP functions 145, and a home subscriber server ("HSS") 150. Although depicted as outside the mobile core network 130, in some embodiments the interworking entity 135 may be located within the mobile core network 130. For example, an instance of the interworking entity 135 located within the mobile core network 130 may provide interworking functions to an untrusted WLAN AN 110.

The CP functions 140 include network control functions that govern access to services of the mobile core network 130. Examples of CP functions 140 include, but are not limited to, the mobility management function, the policy function, the session management function, and the authentication function. The UP functions 145 enable delivery of data and other services to subscriber (e.g., a remote unit 105). The HSS 150 is a central database that contains user-related and subscription-related information. Although a specific number of CP functions 140, UP functions 145, and HSS 150 are depicted in FIG. 1, one of skill in the art will recognize that any number of CP functions 140, UP functions 145, and HSS 150 may be included in the mobile core network 130. Further, the wireless communication system 100 may include any number of mobile core networks 130.

In next-generation ("5G") 3GPP mobile core networks 130, both the mobile RAN 120 and the WLAN AN 110 communicate with the core network using a common control plane interface (e.g., the "NG2" interface) and a common user (data) plane interface (e.g., the "NG3" interface). The interworking entity 135 provides interworking between a (standalone) WLAN AN 110 and the mobile core network 130, converting non-3GPP access network protocols to messages sent over the NG2 and NG3 interfaces.

Further, to expedite a remote unit 105 receiving services from the mobile core network 130, the interworking entity 135 sends a 3GPP attach request to the mobile corner of 130 on behalf of the remote unit 105 when the remote unit 105 connects to a WLAN AN 110 and carries out an authentication procedure with the interworking entity 135. Here, the interworking entity 135 may perform AAA functions for the WLAN AN 110 in May for their convert 3GPP authentication messages used by the mobile core network 130 into authentication messages used by the WLAN AN 110.

Figure 2:
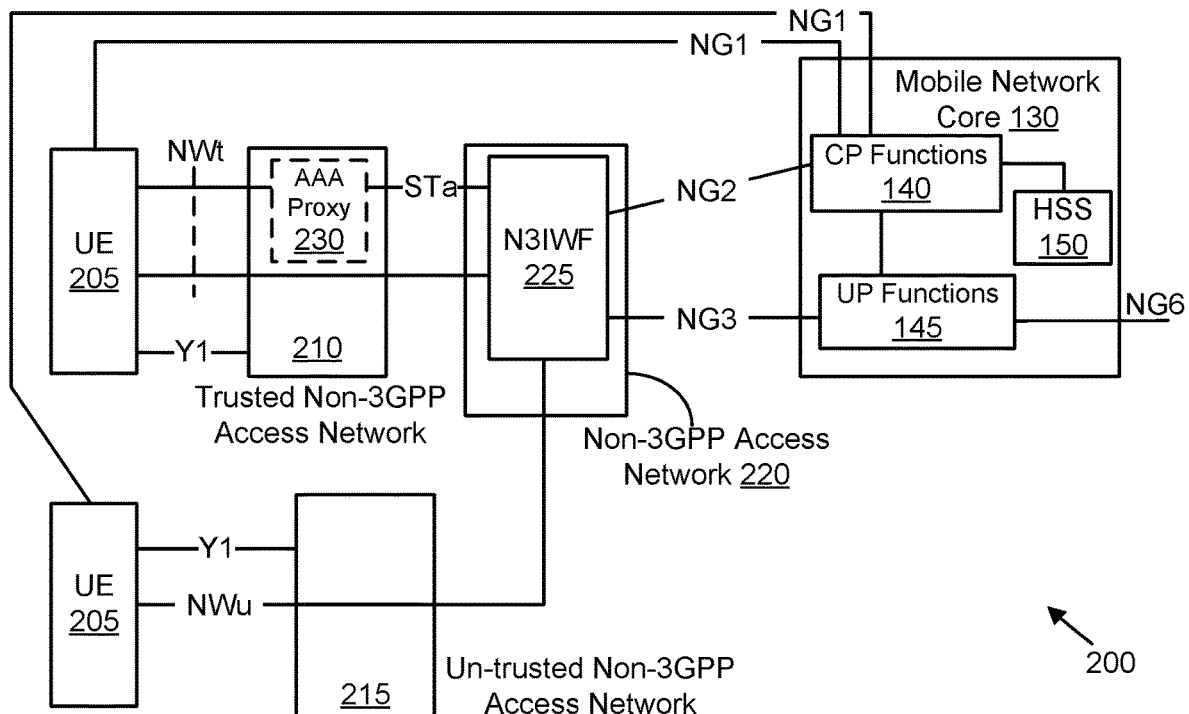
FIG. 2 illustrates one embodiment of a network architecture for connecting a remote unit to a mobile core network via a non-3GPP access network using an interworking entity.

FIG. 2 depicts a network architecture 200 used for connecting a remote unit to a mobile core network via a non-3GPP access network using an interworking entity, according to embodiments of the disclosure. The network architecture 200 includes a UE 205, a trusted non-3GPP access network 210, an untrusted non-3GPP access network 215, a non-3GPP access network 220 containing a non-3GPP interworking function ("N3IWF") 225, and a mobile core network 130. The UE 205 may be one embodiment of the remote unit 105 discussed above with reference to FIG. 1. The mobile core network 130 may be substantially described above with reference to FIG. 1 and includes CP functions 140, UP functions 145, and a HSS 150, also as described above.

The trusted non-3GPP access network 210 is an access network by which the UE 205 can access the mobile core network 130. The trusted non-3GPP access network 210 may be a wireless access network (such as a WLAN), a fixed broadband access network, a satellite access network, and the like. However, the trusted non-3GPP access network 210 differs from (e.g., does not include) the mobile RAN 120 containing the cellular base unit 121, discussed above with reference to FIG. 1. Further, the trusted non-3GPP access network 210 is a standalone access network, meaning it is not a part of a 3GPP RAN (e.g., the mobile RAN 120). A trusted WLAN AN 110 is one embodiment of the trusted non-3GPP access network 210.

In certain embodiments, the trusted non-3GPP access network 210 includes an AAA proxy 230. The trusted non-3GPP access network 210 includes the AAA proxy 230 where the N3IWF is deployed outside the trusted non-3GPP access network 210. The AAA proxy access intermediary to AAA traffic between the UE 205 and the N3IWF 225. Here, the N3IWF 225 acts as an AAA server towards the UE 205 and communicates with the AAA proxy 230 using the STa interface. However, in embodiments where the N3IWF is deployed within the trusted non-3GPP access network, the AAA proxy 230 is not needed and may be omitted.

The untrusted non-3GPP access network 215 is another access network by which the UE 205 can access the mobile core network 130. The untrusted non-3GPP access network 215 may be a wireless access network (such as a WLAN), a fixed broadband access network, a satellite access network, and the like. Like the trusted non-3GPP access network 210, the untrusted non-3GPP access network 215 is outside of, and does not include, the 3GPP mobile RAN 120 containing the cellular base unit 121, discussed above with reference to FIG. 1. Further, the untrusted non-3GPP access network 215 is a standalone access network. As used herein, a WLAN deployment that is not a part of the RAN is referred to as a "standalone" WLAN. An untrusted WLAN AN 110 is one embodiment of the untrusted non-3GPP access network 215.

As depicted, the UE 205 communicates with the trusted non-3GPP access network 210 using a NWt interface and a Y1 interface. Through the NWt interface, the UE 205 accesses the N3IWF 225 and, where present, the AAA proxy 230. Similarly, the UE 205 communicates with the untrusted non-3GPP access network 215 using a NWu interface and the Y1 interface. Through the NWu interface, the UE 205 accesses the N3IWF 225. Note that the untrusted non-3GPP access network 215 does not include an AAA proxy 230. Thus, the NWu interface does not allow the UE 205 access to an AAA proxy 230. Upon connecting to the mobile core network 130, the UE 205 communicates with the CP functions 140 through the NG1 interface.

Also as depicted, the N3IWF 225 communicates with the mobile core network 130 via the NG2 interface and the NG3 interface. As discussed above, the NG2 interface is a control plane interface by which the N3IWF 225 communicates with the CP functions 140. Similarly, the NG3 interface is a user plane interface by which the N3IWF 225 communicates with the UP functions 145. For completeness, the NG6 interface is shown by which the UP functions 145 communicate with data networks outside the mobile core network 130.

The network architecture 200 includes the N3IWF 225, which may be one embodiment of the interworking entity 135 discussed above with reference to FIG. 1. The N3IWF performs the first authentication procedure with the UE 205 while simultaneously attaching the UE 205 to the mobile core network 130, e.g., by using a 3GPP attachment procedure. In some embodiments, the N3IWF 225 communicates with a single control plane function of the CP functions 140 when attaching the UE 205. In other embodiments, the N3IWF 225 communicates with a plurality of functions of the CP functions 140 when attaching the UE 205. The N3IWF 225 performs interworking between the first authentication procedure and the 3GPP attachment procedure, as discussed in greater detail with reference to FIGS. 10A-B and 11A-B.

In some embodiments, the N3IWF 225 may be deployed within the trusted non-3GPP access network 210. In other embodiments, the N3IWF 225 may be deployed within the mobile core network 130. Still further, in some embodiments the network architecture 200 may include multiple instances of the N3IWF 225. For example, the trusted non-3GPP access network 210 may include one instance of the N3IWF 225 while the mobile core network 130 may include a second instance of the N3IWF 225.

Figure 3:
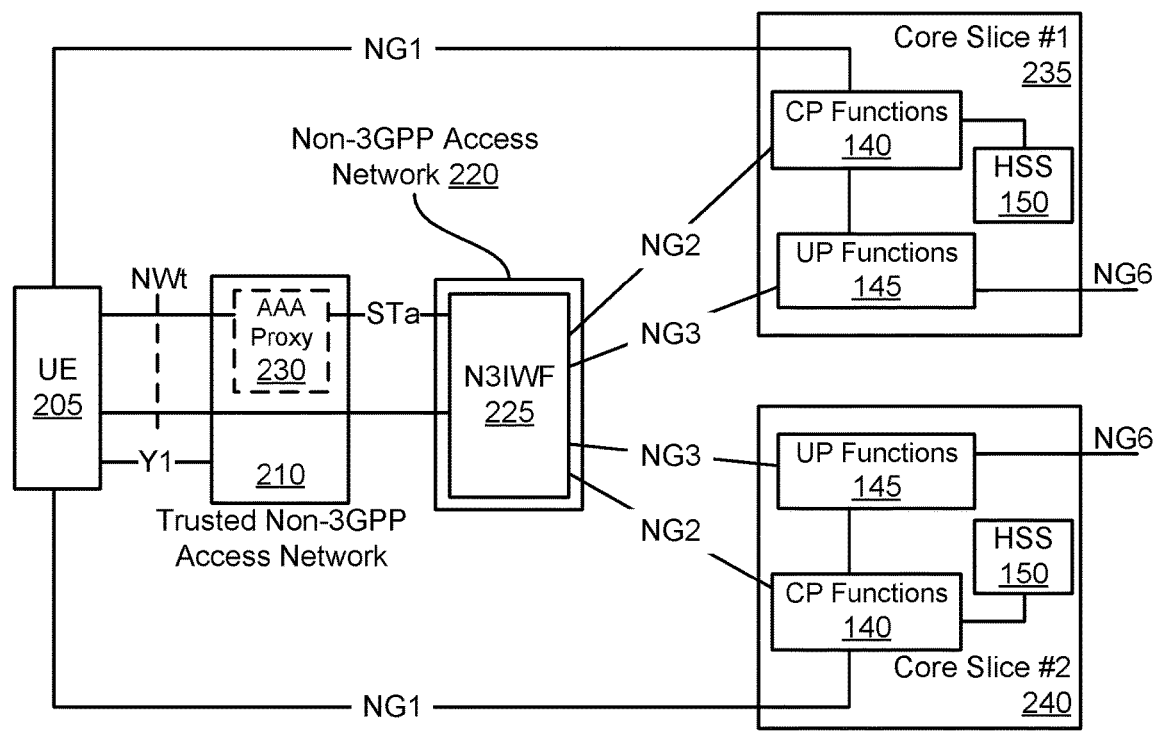
FIG. 3 illustrates one embodiment of a network architecture where an access network interworking entity is connected to multiple network slices.

FIG. 3 depicts a network architecture 300 used for connecting a remote unit to a mobile core network via a non-3GPP access network using an interworking entity, according to embodiments of the disclosure. The network architecture 300 includes a UE 205, the trusted non-3GPP access network 210, and the non-3GPP access network 220 including the N3IWF 225. The trusted non-3GPP access network 210, the non-3GPP access network 220, and the N3IWF 225 may be substantially described above with reference to FIG. 2. In the network architecture 300, the N3IWF 225 is connected to multiple network slices, here a first core network slice 235, and a second core network slice 240. The first core network slice 235 and the second core network slice 240 may be part of the mobile core network 130 discussed above with reference to FIGS. 1 and 2. Here, each core network slice 235-240 is depicted as having its own CP functions 140, UP functions 145, and HSS 150. Each core network slice 235-240 may be optimized for certain traffic type. For example, the first core network slice 235 may be optimized for mobile broadband traffic while the second core network slice 240 may be optimized for Internet of Things ("IoT") traffic and machine type communications ("MTC").

As shown in FIG. 3, the N3IWF 225 may perform network slice selection based on information provided by the UE 205. For example, when the UE 205 provides its subscriber identity to the N3IWF 225 (e.g., during the first authentication procedure), the UE 205 may additionally provide slice selection "assistance information." Using the slice selection information, the N3IWF 225 may select an appropriate network slice, e.g., from among the network slices 235-240. In one embodiment, the UE 205 provides a special identity decorated with (e.g., containing) the slice selection information, wherein the N3IWF 225 selects a network slice (e.g., initiates a proxy attachment with a particular work slice) based on the slice selection information. This decorated identity may comprise the subscriber identity and a slice selection information combined into a single value. In certain embodiments, the slice selection information may be a character string appended to the subscriber identity with a special character used to separate the subscriber identity from the slice selection information.

Although not depicted as containing such, in some embodiments the network architecture 300 includes an untrusted non-3GPP access network, such as the untrusted non-3GPP access network 215. In such embodiments, the untrusted non-3GPP access network is connected to the N3IWF 225. Again, the UE 205 may provide slice selection information to the N3IWF 225, wherein the N3IWF 225 selects an appropriate network slice based on the provided slice selection information. When the mobile core network 130 is comprised of one network slice only and the slice selection information does not match this network slice, the N3IWF 225 may reject the UE 205. Similarly, the N3IWF 225 may reject the UE 205 if it sends slice selection information that does not match any deployed network slice in the mobile core network 130.

Figure 4:
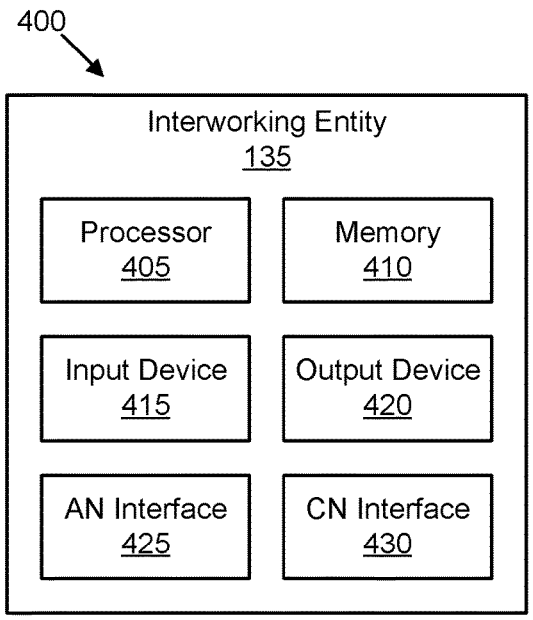
FIG. 4 is a block diagram illustrating one embodiment of a computing device for connecting a remote unit to a mobile core network via a non-3GPP access network using an interworking entity.

FIG. 4 depicts one embodiment of an apparatus 400 that may be used for connecting a remote unit to a mobile core network via a non-3GPP access network, according to embodiments of the disclosure. The apparatus 400 includes one embodiment of the interworking entity 135. Furthermore, the remote unit 105 may include a processor 405, a memory 410, an input device 415, a display 420, an access network ("AN") interface 425, and a core network ("CN") interface 430. In some embodiments, the input device 415 and the display 420 are combined into a single device, such as a touchscreen. In certain embodiments, the remote unit 105 may not include any input device 415 and/or display 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, the AN interface 425, and the CN interface 430.

In certain embodiments, the processor 405 initiates the first authentication procedure with the remote unit 105 over a non-3GPP access network. For example, the processor 405 may utilize the AN interface 425 to initiate the first authentication procedure. In some embodiments, the non-3GPP access network is a trusted WLAN access network and the processor 405 initiates an EAP-AKA' procedure, as discussed below with reference to FIGS. 10A-B. In some embodiments, the non-3GPP access network is an untrusted WLAN access network in the processor 405 initiates an EAP-AKA' procedure encapsulated into IKEv2 signaling, as discussed below with reference to FIGS. 11A-B.

Additionally, the processor 405 sends a 3GPP attach request to the mobile core network 130 on behalf of the remote unit 105. For example, the processor 405 may utilize the CN interface 430 to send the 3GPP attach request. Here, the apparatus 400 acts as a proxy of the remote unit 105 for 3GPP attachment with the mobile core network 130.

The processor 405 receives an attachment authentication request from the mobile core network 130 (e.g., an authentication request of the 3GPP attachment procedure). For example, the processor 405 may receive the attachment authentication request over the CN interface 430. The processor 405 then transforms the attachment authentication request into an authentication request of the first authentication procedure. In doing so, processor 405 performs interworking between the 3GPP attachment procedure and the first authentication procedure (e.g., utilized by the non-3GPP access network). Where the first authentication procedure is an EAP-AKA' procedure, the processor 405 may generate an EAP-AKA' challenge message using parameters from the 3GPP attachment authentication request.

The processor 405 sends the authentication request of the first authentication procedure over the AN interface 425 and receives an authentication response according to the first authentication procedure (also over the AN interface 425). The processor 405 then uses the authentication response of the first authentication procedure to complete attachment to the mobile core network 130. Where the first authentication procedures a EAP-AKA' procedure, the processor 405 uses parameters from a EAP-AKA' challenge response to complete proxy attachment of the remote unit 105 to the mobile core network 130. For example, the processor 405 may generate a 3GPP attachment authentication response from a EAP-AKA' challenge response. In one embodiment, the processor 405 further receives an attach accept message from the mobile core network 130 in response to the attachment authentication response. At the same time, the processor 405 may receive security keys for protecting the user traffic over the non-3GPP access network. In another embodiment, the processor 405 further sends a EAP-AKA' notification to the remote unit, the EAP-AKA' notification including a network address of the apparatus 400.

In some embodiments, the processor 405 initiates the first authentication procedure by requesting a subscriber identity of the remote unit 105. In certain embodiments, the processor 405 may receive (over the AN interface 425) a subscriber identity response comprising the subscriber identity and slice selection information, wherein the processor 405 sends the 3GPP attach request to a particular network slice (e.g., first and second core network slices 235-240) in the mobile core network 130 based on the slice selection information. When the mobile core network 130 is comprised of one network slice only and the slice selection information does not match this network slice, the processor 405 may reject the remote unit 105. Similarly, the processor 405 may reject the remote unit 105 if it sends slice selection information that does not match any deployed network slice in the mobile core network 130.

In one embodiment, the subscriber identity response contains a decorated identity combining the subscriber identity and the slice selection information into a single string. In certain embodiments, the processor 405 includes the subscriber identity into the 3GPP attach request. The processor 405 may further indicate, using an information element in the 3GPP attach request, that the remote unit 105 is attaching over a non-3GPP access network. Optionally, the processor 405 may include an identity of the non-3GPP access network in the 3GPP attach request.

In further embodiments, the processor 405 further creates a security key in response to completing attachment to the mobile core network 130 on behalf of the remote unit 105. In certain embodiments, the processor 405 uses the security key to establish a secure connection with the remote unit 105 in response to completing proxy attachment to the mobile core network 130. In one embodiment, the secure connection is a DTLS connection and the security key is a pre-shared key used to establish the DTLS connection. Thereafter, the processor 405 may relay NAS messages between the remote unit 105 and the mobile core network 130 in response to establishing the secure connection.

In some embodiments, the processor 405 further generates a remote unit context in response to completing attachment to the mobile core network. The processor 405 may store the remote unit context in the memory 410. As used herein, the remote unit context includes identifying context of the remote unit 105, such as a network address of the remote unit 105, a subscriber identity of the remote unit 105, and one or more EAP-AKA' identities of the remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to connecting a remote unit to a mobile core network via a non-3GPP access network, for example a protocol stacks, messages, security keys, remote unit identities, remote unit context, and the like. In some embodiments, the memory 410 also stores program code and related data, such as an operating system or other controller algorithms operating on the remote unit 105 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The AN interface 425, in one embodiment, is a network interface for communicating with the non-3GPP access network. In some embodiments, the processor 405 performs the first authentication procedure with remote unit 105 via the AN interface 425. The AN interface 425 may include a plurality of interfaces, such as the NWt and NWu interfaces discussed above with reference to FIG. 2. In some embodiments, the AN interface 425 may include a STa interface for communicating with an AAA proxy 230 in a trusted non-3GPP access network 210, as discussed above with reference to FIG. 2. The AN interface 425 may include hardware circuitry and/or software code for communicating with the non-3GPP access network.

The CN interface 430, in one embodiment, is a network interface for communicating with the mobile core network 130. In some embodiments, the processor 405 performs the 3GPP attachment procedure with the mobile core network 130, on behalf of the remote unit 105, via the CN interface 430. The CN interface 430 may support a plurality of interfaces, such as the NG2 (control plane) and NG3 (user plane) interfaces discussed above with reference to FIG. 2. The CN interface 430 may include hardware circuitry and/or software code for communicating with the mobile core network 130. In some embodiments, the apparatus 400 communicates with a single control plane function of the CP functions 140 when attaching a remote unit 105. In other embodiments, the apparatus 400 communicates with a plurality of functions of the CP functions 140 when attaching the remote unit 105.

Figure 5:
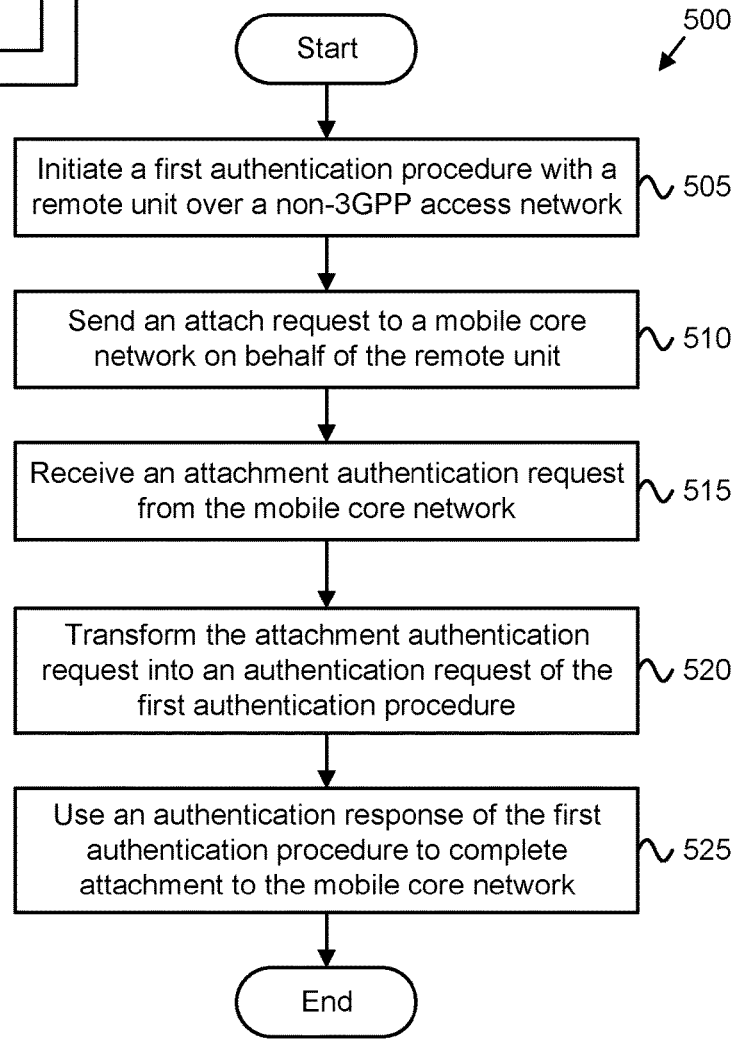
FIG. 5 is a flow chart diagram illustrating another embodiment of a method for connecting a remote unit to a mobile core network via a non-3GPP access network using an interworking entity.

FIG. 5 is a schematic flow chart diagram illustrating one embodiment of a method 500 for connecting a remote unit to a mobile core network via a non-3GPP access network using an interworking entity, according to embodiments of the disclosure. In some embodiments, the method 500 is performed by an apparatus, such as the interworking entity 135, N3IWF 225, or apparatus 400. In certain embodiments, the method 500 may be performed by a processor executing program code, for example, a microcontroller, a microprocessor, a CPU, a GPU, an auxiliary processing unit, a FPGA, or the like.

The method 500 may include initiating 505, by the interworking entity, a first authentication procedure with a remote unit over a non-3GPP access network ("N3AN"). In one embodiment, the processor 405 initiates 505 via the access network interface 425 the first authentic procedure with a remote unit 105. The N3AN may be a WLAN. In one embodiment, the N3AN is a trusted WLAN access network ("TWAN") and the first authentic procedure is an EAP-AKA' procedure sent via a NWt interface. In another embodiment, the N3AN is an untrusted WLAN access network ("UTWAN") and the first authentication procedure is an EAP-AKA' procedure embedded within a IKEv2 procedure sent via a NWu interface.

In certain embodiments, initiating 505 the first authentication procedure includes the interworking entity requesting a subscriber identity of the remote unit. In one embodiment, the subscriber identity is an IMSI belonging to the remote unit. In some embodiments, the interworking entity receives a subscriber identity response that contains both a subscriber identity and slice selection information. In one embodiment, the subscriber identity response contains a decorated identity, the decorated identity combining the subscriber identity and a slice selection information into a single value.

The method 500 includes sending 510, by the interworking entity, an attach request to a mobile core network on behalf of the remote unit. In one embodiment, the processor 405 sends 510 via a core network interface 430 (e.g., using a logical NG2 interface) an attach request to the mobile core network 130 on behalf of the remote unit 105. In certain embodiments, an attach proxy (such as the attach proxy 615 described below) sends 510 the attach request to the mobile core network 130 on behalf of the remote unit 105. In certain embodiments, sending 510 the attach request includes sending the attach request to one or more control plane functions 140 in the mobile core network 130.

In some embodiments, sending 510 the attach request includes sending the subscriber identity and (optionally) an identity of the N3AN within the attach request. Additionally, the attach request may indicate an attachment is being made over the N3AN. In certain embodiments, the mobile core network 130 may include two or more network slices. In such embodiments, the interworking entity may receive slice selection information from the remote unit, wherein sending 510 the attach request includes sending the attach request to particular network slice in the mobile core network based on the slice selection information.

The method 500 includes receiving 515, at the interworking entity, and attachment authentication request from the mobile core network. In one embodiment, the processor 405 receives 515 the attachment authentication request from the mobile core network 130 via the NG2 interface. In certain embodiments, the attachment authentication request is part of a 5G attachment procedure and is received 515 in response to sending 510 the attach request.

In some embodiments, the attachment authentication request includes transient security keys for protecting messages from the first authentication procedure communicated between the remote unit 105 and the interworking entity 135. For example, the transient security keys may be transient EAP keys, including a K_aut key and a K_encr key generated as specified in RFC 5448. Protecting messages of the first authentication procedure includes authenticating the identity of a message originator (e.g., to prevent man-in-the-middle attacks) and encrypting some sensitive parts of the authentication messages, such as a temporary identity assigned the remote unit 105.

The method 500 includes transforming 520, by the interworking entity, the attachment authentication request into an authentication request of the first authentication procedure. In one embodiment, the processor 405 transforms 520 the attachment authentication request into the authentication request of the first authentication procedure. In certain embodiments, an attach proxy (such as the attach proxy 615) transforms 520 the attachment authentication request into the authentication request of the first authentication procedure. In one embodiment, the attachment authentication request is a 3GPP authentication request and the authentication request of the first authentication procedure is a EAP-AKA' challenge message. In such an embodiment, 520 the attachment authentication request includes parsing parameters from the 3GPP authentication request and generating an EAP-AKA' challenge message using the parsed parameters.

The method 500 includes using 525, by the interworking entity, an authentication response of the first authentication procedure to complete attachment to the mobile core network. In one embodiment, the processor 405 uses 525 the authentication response of the first authentication procedure to complete attachment of the remote unit 105 to the mobile core network 130. In certain embodiments, an attach proxy (such as the attach proxy 615) uses 525 the authentication response of the first authentication procedure (e.g., an EAP-AKA' authentication procedure) to complete 3GPP attachment of the remote unit 105 to the mobile core network 130. In some embodiments, completing attachment to the mobile core network 130 includes the interworking entity 135 receiving attach accept message from the mobile core network 130 in response to the 3GPP attachment authentication response. In certain embodiments, the interworking entity 135 also receives security keys for protecting the user traffic over the N3AN. For example, the interworking entity may receiver an Initial Context Setup Response message over the NG2 interface that contains an Attach Accept message and a security context containing one or more security keys.

In one embodiment, the authentication response of the first authentication procedure is an EAP-AKA' challenge response. In such an embodiment, using 525 the EAP-AKA' challenge response to complete attachment to the mobile core network 130 includes the interworking entity 135 generating a 3GPP attachment authentication response using the EAP-AKA' challenge response and sending the 3GPP attachment authentication response to one or more control plane functions 140 of the mobile core network 130. Additionally, completing attachment to the mobile core network 130 may include the interworking entity 135 sending the remote unit 105 a EAP-AKA' notification that includes a network address of the interworking entity 135.

In some embodiments, the interworking entity creates a security key in response to completing attachment to the mobile core network 130. Additionally, the interworking entity may use the security key to establish a secure connection with the remote unit 105 in response to completing attachment to the mobile core network 130. In response to establishing the secure connection, the interworking entity may relay NAS messages between the remote unit 105 and the mobile core network 130. In one embodiment, the secure connection is a datagram transport layer security ("DTLS") connection and the security key is used as a pre-shared key to establish the DTLS connection.

In certain embodiments, the interworking entity generates a remote unit context in response to completing attachment to the mobile core network 130. Here, the remote unit context including a network address of the remote unit 105, a subscriber identity of the remote unit 105, and one or more EAP-AKA' identities of the remote unit 105.

Figure 6:
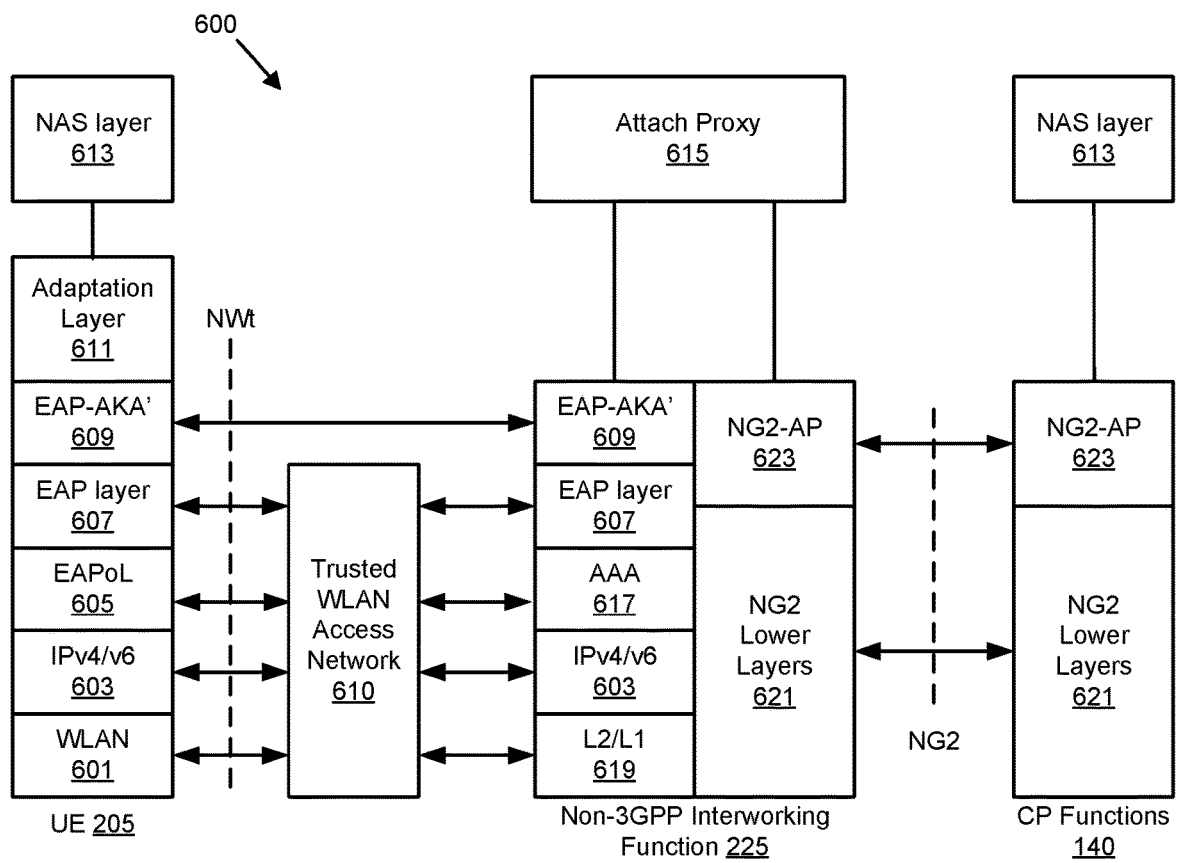
FIG. 6 illustrates one embodiment of a protocol architecture for connecting to a mobile core network via a trusted WLAN access network.

FIG. 6 depicts a protocol architecture 600 for a UE 205 connecting to a mobile core network 130 via a trusted WLAN access network 610 and a N3IWF 225, according to embodiments of the disclosure. The UE 205 is substantially as described above with reference to FIGS. 2 and 3. The UE 205 may be one embodiment of the remote unit 105 described above with reference to FIG. 1. The mobile core network 130 is substantially as described above with reference to FIGS. 1-3 and includes one or more CP functions 140. The trusted WLAN access network ("TWAN") 610 is an embodiment of the WLAN AN 110 and the trusted non-3GPP access network 210 described above with reference to FIGS. 1-3. The N3IWF 225 is substantially described above with reference to FIGS. 2-3. Additionally, the N3IWF 225 may be one embodiment of the interworking entity 135 discussed above with reference to FIGS. 1, 4, and 5.

As depicted, the UE 205 communicates with the TWAN 610 over a NWt interface. The protocol stack of the UE 205 includes WLAN layers 601, an IPv4/v6 layer 603, an EAP over LAN ("EAPoL") layer 605, and an EAP layer 607. The WLAN layers 601 include both a physical layer (layer 1) and data link layer (layer 2) and terminate at the TWAN 610. The TWAN 610 has corresponding layer 1 and layer 2 terminating at the N3IWF 225 based on its connection with the N3IWF 225. For simplicity, layers 2 and 1 are depicted as combined L2/L1 layers 619.

The EAPoL layer 605 terminates at the TWAN 610 and the TWAN 610 has a AAA layer 617 which terminates at the N3IWF 225. In some embodiments, the TWAN 610 includes an AAA proxy 230 which operates at the AAA layer 617. As depicted, each of the UE 205 in the N3IWF 225 includes an EAP layer 607 terminating at the TWAN 610.

The protocol stack of the UE 205 also includes an EAP-AKA' layer 609 which relates to the TWAN 610 and terminates at the N3IWF 225. Above the EAP-AKA' layer 609, the UE 205 includes an adaptation layer 611. The adaptation layer 611 enables operation of the NAS layer 613 over EAP-AKA'. As depicted, the CP functions 140 also include a NAS layer 613.

The protocol stack of the N3IWF 225 includes an attach proxy 615. The attach proxy 615 performs interworking between the EAP-AKA' signaling and the NG2 signaling. As depicted, the N3IWF 225 includes NG2 lower layers 621 and a NG2 application protocol ("AP") layer 623. The NG2 lower layers 621 and NG2 AP layer 623 terminate at the CP functions 140. As discussed above, the N3IWF 225 communicates with the CP functions 140 using the NG2 interface. The attach proxy 615 initiates an attach procedure toward the CP functions 140 on behalf of the UE 205. Thus, the UE 205 attaches to the mobile core network 130 in parallel with performing the EAP-AKA' procedure, as discussed in greater detail below with reference to FIGS. 10A-B.

Figure 7:
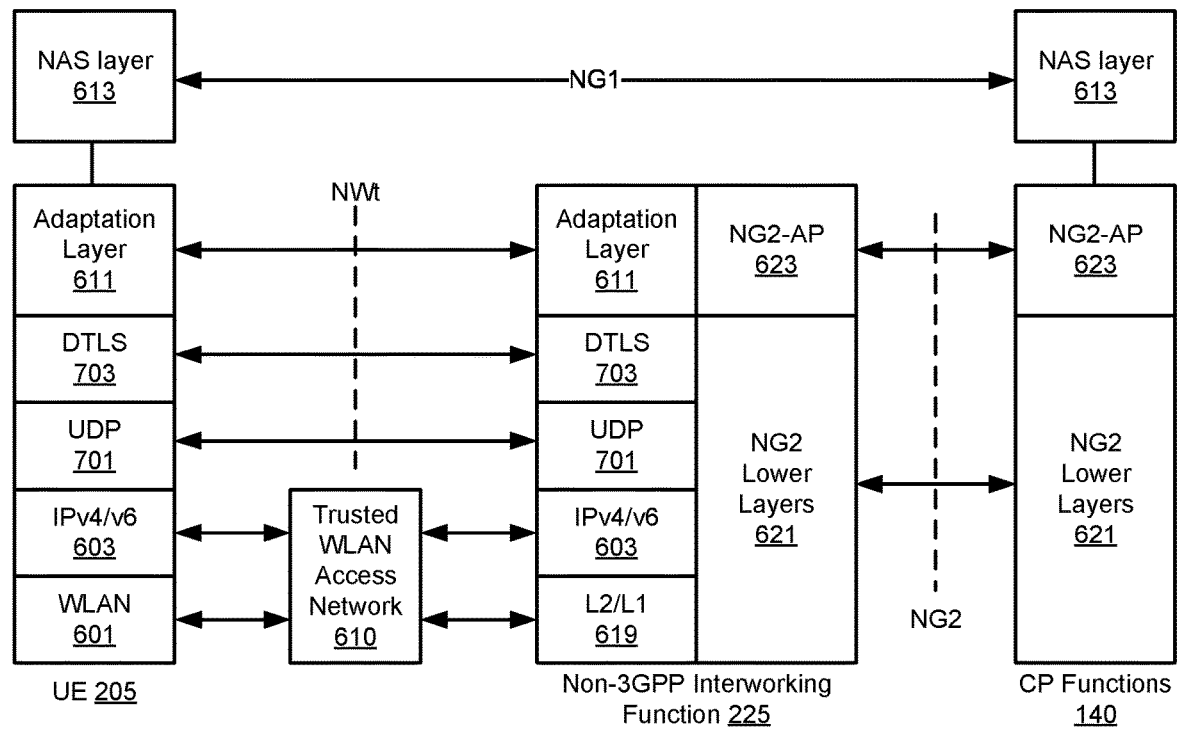
FIG. 7 illustrates one embodiment of a protocol architecture for exchanging NAS signaling with control plane functions via a trusted WLAN access network.

FIG. 7 illustrates one embodiment of a protocol architecture 700 for exchanging NAS signaling between the UE 205 and the CP functions 140 via the TWAN 610, according to embodiments of the disclosure. The protocol architecture 700 occurs after the UE 205 attaches to the mobile core network 130. As discussed below, FIGS. 10A-B describe an attachment procedure used to transition from the protocol architecture 600 to the protocol architecture 700.

After the UE 205 completes the EAP-AKA' procedure and attaches to the mobile core network 130, the UE 205 may exchange NAS signaling (at the NAS layer 613) with the CP functions 140 over the logical NG1 interface. The UE 205 may use the NG1 interface to request data connection, also known as a PDU session, e.g., to communicate with an external data network through the user plane of the mobile core network 130 and via the TWAN 610. Note that the NAS layer 613 in the UE 205 is designed to operate over the radio resource control ("RRC") layer, for example, where the UE 205 attaches to the mobile core network 130 over the mobile RAN 120. Here, the adaptation layer 611 performs all the adaptation functionality required to enable the operation of NAS layer 613 over DTLS/UDP/IP.

As depicted, the protocol stack of the UE 205 includes WLAN layers 601 and an IPv4/v6 layer 603 that interface with the N3IWF 225 via the TWAN 610. Additionally, the UE 205 and N3IWF 225 include a user datagram protocol ("UDP") layer 701 and a Datagram Transport Layer Security ("DTLS") layer 703. The UDP layer 701 is a transport layer, while the DTLS layer 703 provides communication security for UDP datagrams. As discussed in greater detail below, the UE 205 and the N3IWF 225 derive DTLS (pre-shared) keys from the security context received from the CP functions 140 during the attach procedure.

The adaptation layer 611 receives the IP address of N3IWF 225 from the N3IWF 225 and establishes a secure DTLS tunnel with the N3IWF 225. Mutual authentication is applied for this DTLS tunnel.

Figure 8:
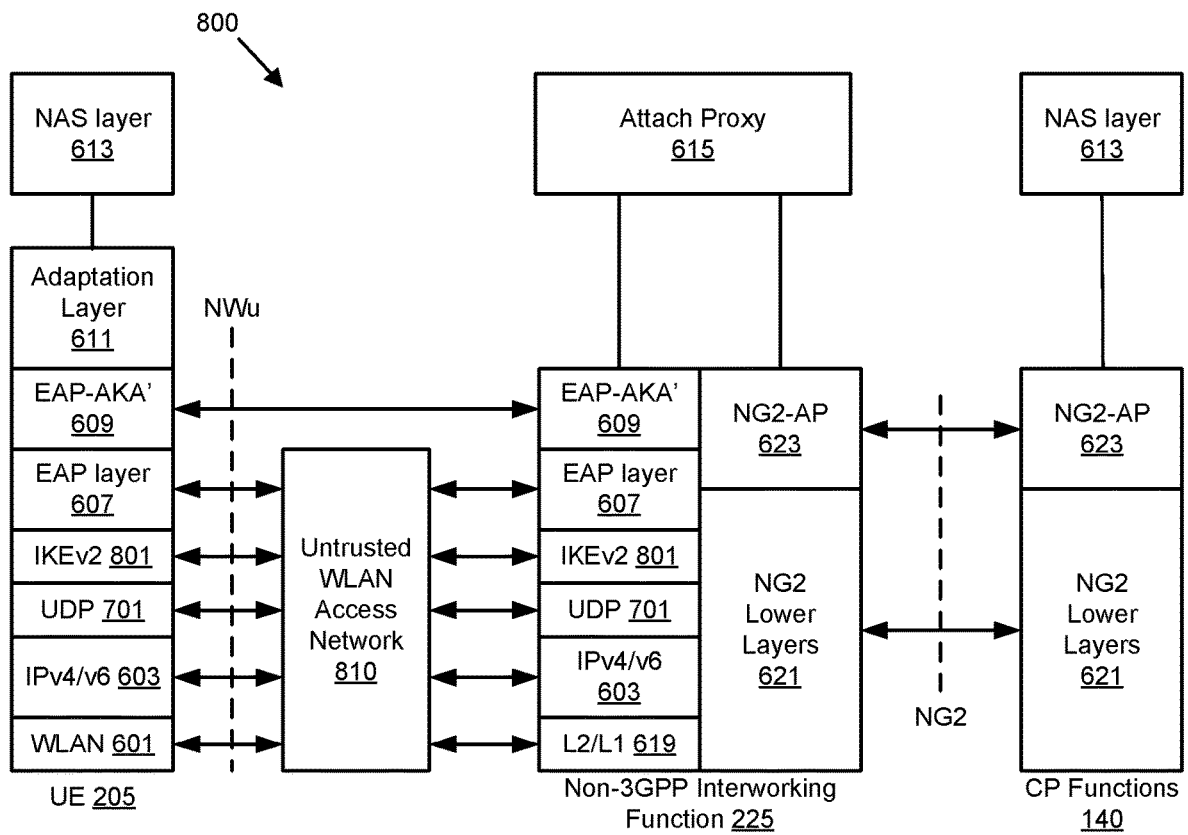
FIG. 8 illustrates one embodiment of a protocol architecture for connecting to a mobile core network via an untrusted WLAN access network.

FIG. 8 depicts a protocol architecture 600 for a UE 205 connecting to a mobile core network 130 via an untrusted WLAN access network 810 and a N3IWF 225, according to embodiments of the disclosure. The UE 205 is substantially as described above with reference to FIGS. 2-3 and 6-7. The UE 205 may be one embodiment of the remote unit 105 described above with reference to FIG. 1. The mobile core network 130 is substantially as described above with reference to FIGS. 1-3 and includes one or more CP functions 140. The untrusted WLAN access network ("TWAN") 810 is an embodiment of the WLAN AN 110 and the untrusted non-3GPP access network 215 described above with reference to FIGS. 1-3. The N3IWF 225 is substantially described above with reference to FIGS. 2-3 and 6-7. Additionally, the N3IWF 225 may be one embodiment of the interworking entity 135 discussed above with reference to FIGS. 1, 4, and 5.

As depicted, the UE 205 communicates with the UTWAN 810 over a NWt interface. The protocol stack of the UE 205 includes WLAN layers 601, an IPv4/v6 layer 603, a UDP layer 701, an IKEv2 layer 801, and an EAP layer 607. The WLAN layers 601 include both a physical layer (layer 1) and data link layer (layer 2) and terminate at the UTWAN 810. The UTWAN 810 has corresponding L2/L1 layers 619 terminating at the N3IWF 225.

The protocol stack of the UE 205 also includes an IPv4/v6 layer 603, an IKEv2 layer 801, and an EAP-AKA' layer 609 which relate to the UTWAN 810 and terminate at the N3IWF 225. The IKEv2 layer 801 allows for establishment of an IKEv2/IPSec connection to the N3IWF. EAP-AKA' signaling is transmitted over the IKEv2/IPSec connection, embedded in IKEv2 authentication messages. The IKEv2 protocol runs on top of UDP, and the EAP-AKA' protocol runs on top of IKEv2. Above the EAP-AKA' layer 609, the UE 205 includes an adaptation layer 611. The adaptation layer 611 enables operation of the NAS layer 613 over EAP-AKA'/IKEv2/UDP. As depicted, the CP functions 140 also include a NAS layer 613.

The protocol stack of the N3IWF 225 includes an attach proxy 615. The attach proxy 615 performs interworking between the EAP-AKA' signaling and the NG2 signaling. As depicted, the N3IWF 225 includes NG2 lower layers 621 and a NG2 application protocol ("AP") layer 623. The NG2 lower layers 621 and NG2 AP layer 623 terminate at the CP functions 140. As discussed above, the N3IWF 225 communicates with the CP functions 140 using the NG2 interface. The attach proxy 615 initiates an attach procedure toward the CP functions 140 on behalf of the UE 205. Thus, the UE 205 attaches to the mobile core network 130 in parallel with performing an EAP-AKA'-over-IKEv2 authentication procedure, as discussed in greater detail below with reference to FIGS. 11A-B.

Figure 9:
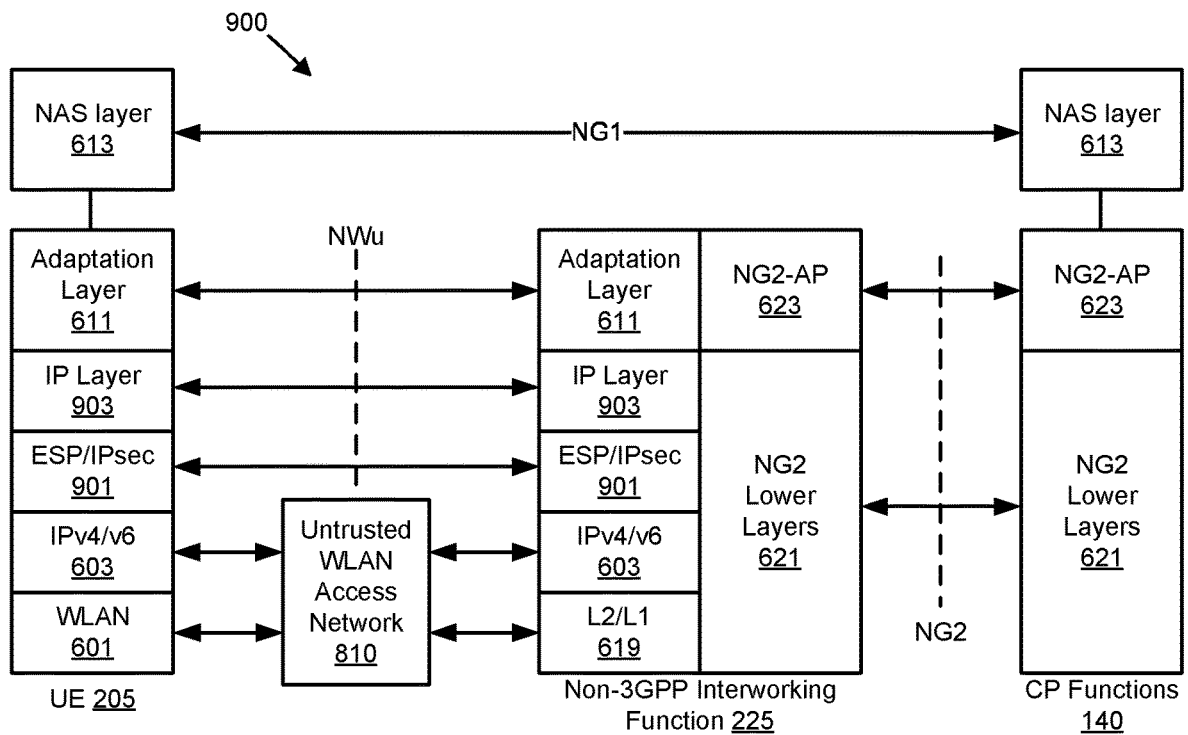
FIG. 9 illustrates one embodiment of a protocol architecture for exchanging NAS signaling with control plane functions via an untrusted WLAN access network.

FIG. 9 illustrates one embodiment of a protocol architecture 900 for exchanging NAS signaling between the UE 205 and the CP functions 140 via the UTWAN 810, according to embodiments of the disclosure. The protocol architecture 900 occurs after the UE 205 attaches to the mobile core network 130. As discussed below, FIGS. 11A-B describe an attachment procedure used to transition from the protocol architecture 800 to the protocol architecture 900.

After the UE 205 completes the EAP-AKA' procedure and attaches to the mobile core network 130, the UE 205 may exchange NAS signaling (at the NAS layer 613) with the CP functions 140 over the logical NG1 interface. The UE 205 may use the NG1 interface to request data connection (PDU session) to communicate with an external data network through the user plane of the mobile core network 130 and via the UTWAN 810. Note that the NAS layer 613 in the UE 205 is designed to operate over the RRC layer, for example, where the UE 205 attaches to the mobile core network 130 over the mobile RAN 120. Here, the adaptation layer 611 performs all the adaptation functionality required to enable the operation of NAS layer 613 over IP/ESP/IPSec.

As described below, with reference to FIGS. 11A-B, the UE 205 attaches to the mobile core network 130 (via the CP functions 140) using EAP-AKA' via IKEv2 signaling. During attachment, the UE 205 establishes an IPsec tunnel with the N3IWF 225. This IPsec tunnel is supported at the encapsulating security payload ("ESP")/IPsec layer 901. Again, the adaptation layer 611 enables the operation of the NAS layer 613 over non-RRC protocols, here the ESP/IPsec layer 901 and IP layer 903. The adaptation layer 611 discovers the IP address of the N3IWF 225, establishing the IP layer 903. The protocol architecture 900 allows the UE 205 to request a PDU session over the logical NG1 interface while attached to the mobile core network 130 via the UTWAN 810.

Figure 10A:
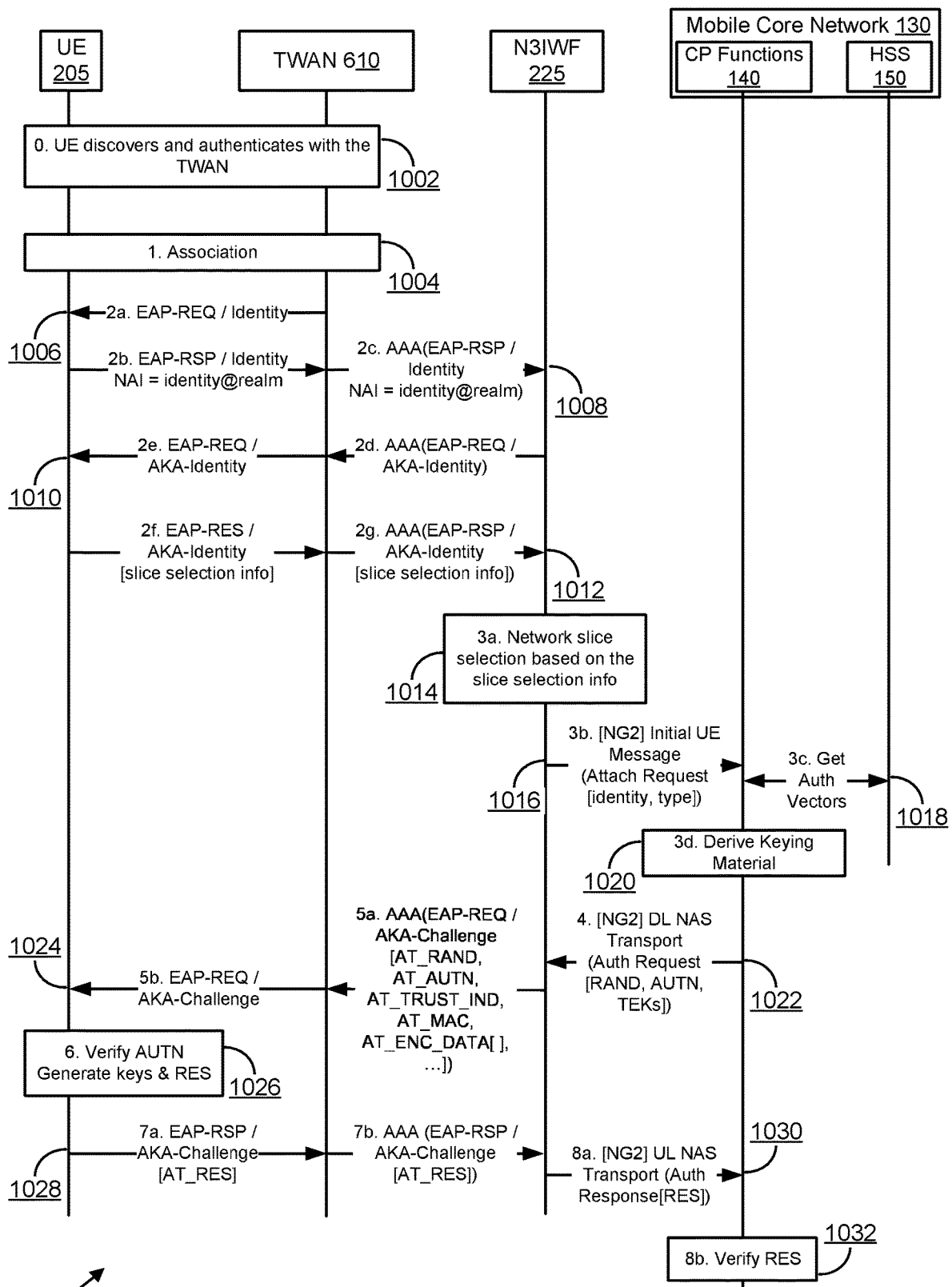
FIG. 10A illustrates one embodiment of a signaling procedure for connecting to a mobile core network via a trusted WLAN access network.
Figure 10B:
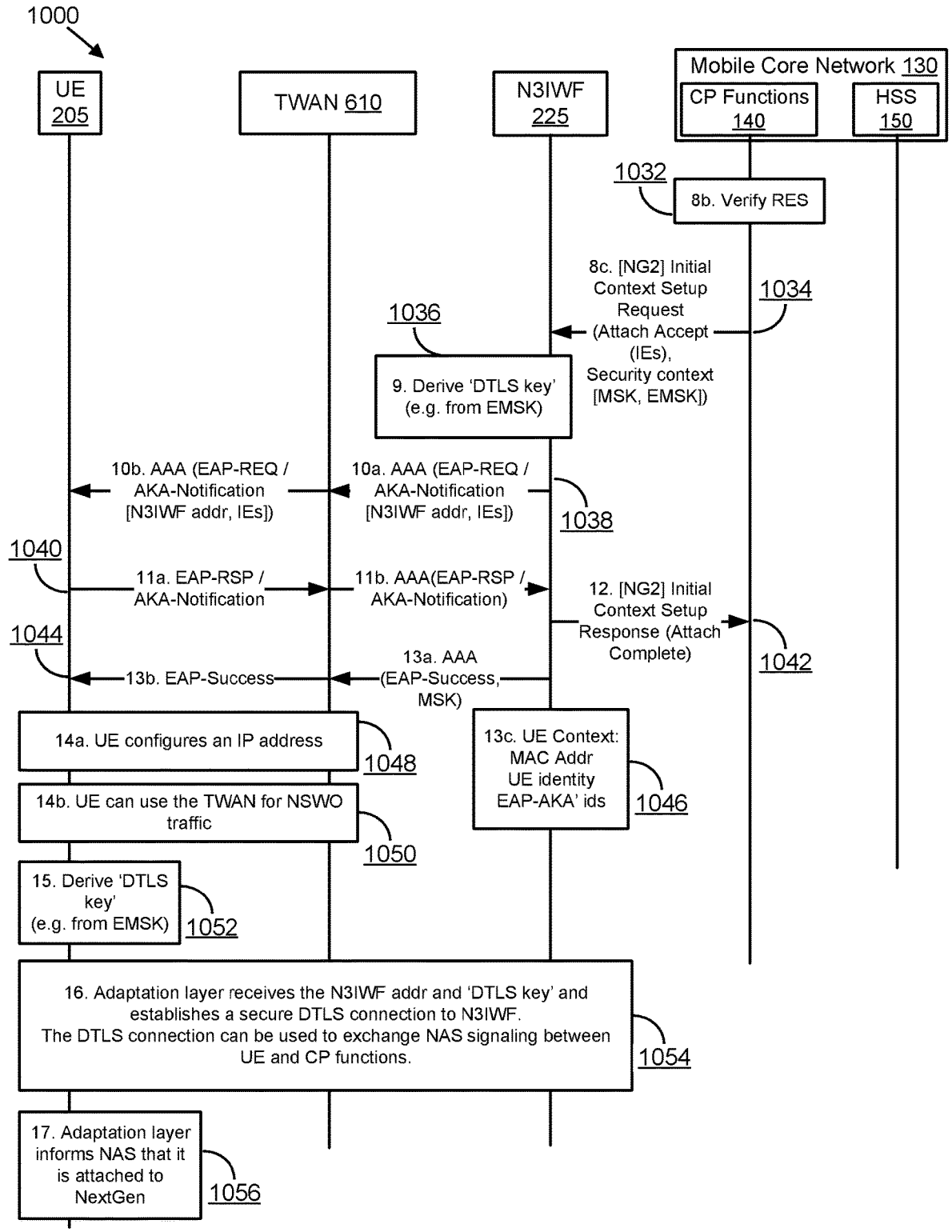
FIG. 10B continues the signaling procedure of FIG. 10A.

FIG. 10A-10B illustrate a signaling procedure 1000 for connecting to a mobile core network 130 via a trusted WLAN access network 610. The signaling procedure 1000 depicts actions performed by and communications among the UE 205, the TWAN 610, the N3IWF 225, and the mobile core network 130. The UE 205, the TWAN 610, the N3IWF 225, and the mobile core network 130 are substantially as described above with reference to FIGS. 1-2 and 5-7. The signaling procedure 1000 depicts how the UE 205 is authenticated by the CP functions 140 of the mobile core network 130 (via the NG2 interface) and is authorized to access the TWAN 610. In some embodiments, the N3IWF 225 communicates with a single control plane function of the CP functions 140 when attaching and authenticating the UE 205. In other embodiments, the N3IWF 225 communicates with a plurality of functions of the CP functions 140 when attaching and authenticating the UE 205.

Beneficially, steps 1002-1050 below do not require new UE capabilities. Steps 1002-150 may be performed by any UE 205 supporting EAP-AKA' in order to connect to a trusted WLAN access network (e.g., the TWAN 610) after being authenticated and authorized by its home PLMN (e.g., the mobile core network 130). Such a legacy UE 205 will be able to use the TWAN 610 only for Non-Seamless WLAN Offload ("NSWO") traffic.

At 1002, the UE 205 discovers and authenticates with the TWAN 610. The UE 205 applies normal EAP-AKA' procedures to connect to the TWAN 610. At 1004, the UE 205 associates with the TWAN 610 according to existing procedures.

At 1006, the TWAN 610 begins an IEEE 802.1x access control procedure by transmitting an EAP-REQ/Identity request. Note that 802.1x messages (e.g., EAP-over-LAN) are not shown in the signaling procedure 1000. At 1008, the UE 205 provides an identity along with a realm, which is primarily used for routing purposes. Based on the provided realm, the TWAN 610 routes the EAP-RSP/Identity message to the N3IWF 225. At 1010, the N3IWF 225 then requests a specific identity (e.g., a permanent or temporary subscriber identity) from the UE 205. Note that, from the TWAN 610 point of view, the N3IWF 225 serves as an AAA server, encapsulating the EAP-AKA' signaling within AAA messages.

In some embodiments, the mobile core network 130 includes multiple network slices. If the UE 205 supports network slice selection over trusted WLAN access, then the UE 205 may provide slice selection "assistance information" to the N3IWF 225. In one embodiment, the UE 205 provides the slice selection information by decorating the provided identity with slice selection "assistance information." This "assistance information" is used by the N3IWF 225 to select a suitable network slice for the UE 205.

For example, based on the slice selection "assistance information" the N3IWF 225 may select a slice optimized for IoT operation. Thus, if the UE 205 has the IMSI identity "295023820005424," then the UE 205 may provide a decorated IMSI identity of "295023820005424%iot". Here, "%" is a special character reserved to separate the IMSI identity from the slice selection 'assistance information' which, in this example, is 'iot'. As will be appreciated by one of skill in the art, the special character is not limited to "%", it may be any suitable character reserved to distinguish the subscriber identity from the slice selection information.

Alternatively, instead of decorating the UE identity, a new EAP-AKA' attribute e.g., parameter or information element within a EAP-AKA' identity message) may be defined that carries the slice selection "assistance information" from the UE. At 1012, the UE 205 transmits an EAP-AKA' identity response, here depicted as containing slice selection information, and the TWAN 610 forwards the identity response to the N3IWF 225. At 1014, the N3IWF 225 performs network slice selection based on the slice selection information.

At 1016, the attach proxy 615 in the N3IWF 225 creates an initial UE message containing an attach request message on behalf of the UE 205. The attach request message includes the received subscriber identity of the UE 205. The attach request message also includes a "type" information element (IE) indicating that the attachment is over a trusted non-3GPP access network (e.g., the TWAN 610). The attach request message may further include the identity (e.g., ESSID) of the TWAN 610.

The attach request message is used to authenticate the UE 205 and authorize access to the TWAN 610. In certain embodiments, the attach request message omits information elements specific to 3GPP (RAN) access, such as old location area identity ("LAI"), UE network capabilities, discontinuous reception ("DRX") parameters, and the like.

At 1018, the mobile core network 130 obtains authentication vectors. Here, the CP functions 140 consult with the HSS 150 to obtain the authentication vectors. At 1020, the CP functions 140 of the mobile core network 130 derive keying material.

At 1022, the CP functions 140 send a DL NAS transport message to the N3IWF 225 over the NG2 interface, the DL NAS transport message containing an authentication request. The authentication request is part of the 3GPP attach procedure and includes a random value ("RAND"), an authentication parameter ("AUTN"), and a plurality of transient EAP keys ("TEKs"). Specifically, the N3IWF 225 receives authentication key ("K_aut") and encryption key ("K_encr") TEKs which are used to protect the EAP-AKA' signaling between the UE 205 and N3IWF 225. In certain embodiments, the TEKs keys are included in the Authentication Request only when the type IE in the Attach Request indicates non-3GPP access.

At 1024, the N3IWF 225 sends an EAP-AKA' authentication message (here an EAP-REQ/AKA-Challenge message) to UE 205. The RAND and AUTN parameters received at 1022 are included in this message. Also, the EAP-AKA' authentication message includes a message authentication code attribute ("AT_MAC") calculated based on the K_aut key received at 1022. If there is need to send encrypted parameters to the UE 205 (e.g., inside a AT_EN-CR_DATA attribute), these parameters are encrypted based on the K_encr key received at 1022.

At 1026, the UE 205 verifies the AUTN, generates the session keys (e.g., a master session key ("MSK"), an extended master session key ("EMSK"), the K_aut key, the K_encr key, etc.) and derives a result (RES) to the EAP-AKA' authentication message (e.g., the EAP-REQ/AKA-Challenge message) containing a result attribute ("AT_RES"). At 1028 the UE 205 sends an EAP-AKA' authentication response (here an EAP-REQ/AKA-Challenge response) to the N3IWF 225. At 1030, the N3IWF derives a 3GPP Authentication Response message containing the result (RES) received from the EAP-AKA' response. The N3IWF 225 also sends the 3GPP Authentication Response message to the CP functions 140 over NG2.

At 1032, the CP functions 140 verify the result (RES). If the result (RES) is correct, the CP functions 140 respond with an Attach Accept message at 1034 (shown embedded in a "Initial Context Setup Request" message). This Attach Accept message may include parameters (referred to as IEs in FIG. 10B) to be transferred to the UE 205. For example, the Attach Accept message may include a temporary UE identity. Additionally, the "Initial Context Setup Request" message may include security context containing the session keys (e.g., MSK, EMSK) previously derived by the UE 205 and which are needed to protect the WLAN air interface traffic.

At 1036, the N3IWF 225 derives a "DTLS key" (e.g., from the EMSK) to be used at a later point for the establishment of a secure DTLS connection with the UE 205. As used herein, the "DTLS key" refers to a security key used as a pre-shared key to establish the DTLS connection. Note that the same DTLS key is also derived by the UE 205 after the successful authentication. At 1038, the N3IWF 225 sends an EAP-AKA' notification message (here a EAP-REQ/AKA-Notification message) to the UE 205 which includes the address of N3IWF 225 and other parameters (IEs) that were included in the Attach Accept message (e.g., a new temporary identity). Note that a legacy UE 205 will ignore the address of N3IWF and the other parameters (IEs).

At 1040, the UE 205 responds with EAP-AKA' notification response (here an EAP-RES/AKA-Notification) which triggers the N3IWF 225 to send an Attach Complete message to CP functions 140 at 1042. At 1044, the EAP-AKA' authentication procedure completes with an EAP-Success message. The MSK is further transferred to the TWAN 610 (also at 1044) in order to derive the Pairwise Master Key (PMK), as defined in the IEEE 802.11 specification.

At 1046, the N3IWF 225 creates a UE Context which stores information such as the UE MAC address, the UE temporary identity (included in the Attach Accept message), the EAP-AKA' identities of the UE 205 (e.g. a pseudonym and/or fast re-authentication identities), and the like. At this point, the UE 205 is connected to (e.g., associated with) the TWAN 610 and can establish layer-3 connectivity at 1048, e.g., by receiving an IPv4 address via DHCP. At 1050, the UE 205 can then use the TWAN 610 for NSWO traffic.

Note that the above steps of the signaling procedure 1000 do not require new UE capabilities and thus may be performed by a legacy UE 205. However, steps 1052-1056 require new UE capabilities.

At 1052, the UE 205 derives the DTSL key as discussed above, in response to the successful authentication of the UE 205 at the mobile core network 130. At 1054, the adaptation layer 611 in the UE 205 establishes a secure DTLS connection to the N3IWF 225 by using the security key derived in step 1052 as a DTLS pre-shared key. The adaptation layer 611 in the UE 205 initiates the DTLS connection to the address of N3IWF 225 received in step 1038.

At 1056, the adaptation layer 611 in the UE 205 notifies the NAS layer 613 that a 3GPP attach via trusted WLAN access (e.g., the TWAN 610) is completed. The adaptation layer 611 also provides to the NAS layer 613 the IEs provided by the mobile core network 130 in the Attach Accept message (e.g., as received by the UE 205 at 1038). At this point, the NAS layer 613 in the UE 205 may initiate NAS signaling with the CP functions 140 in the network, e.g., in order to setup a PDU session over WLAN access.

Figure 11A:
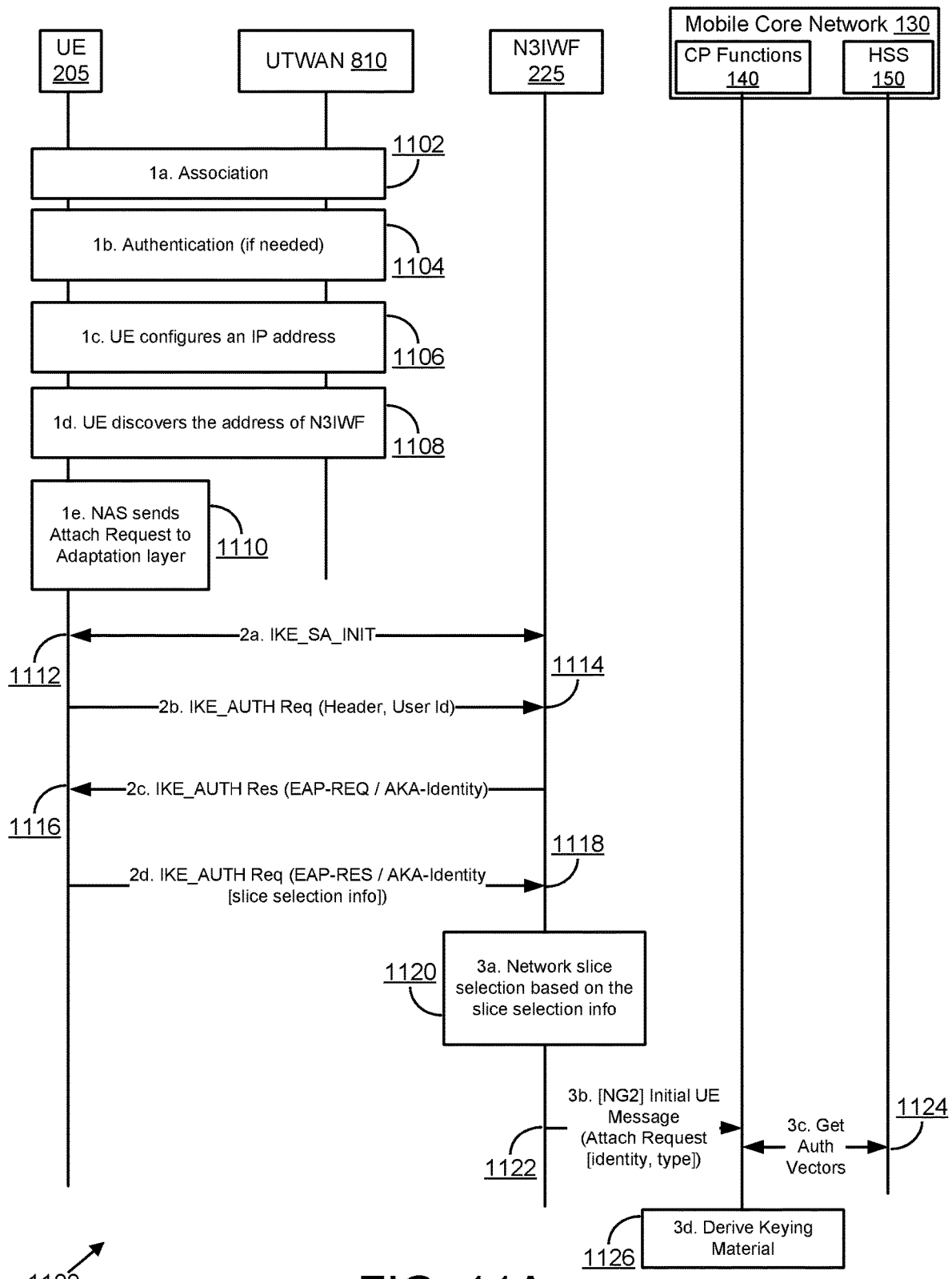
FIG. 11A illustrates one embodiment of a signaling procedure for connecting to a mobile core network via an untrusted WLAN access network.
Figure 11B:
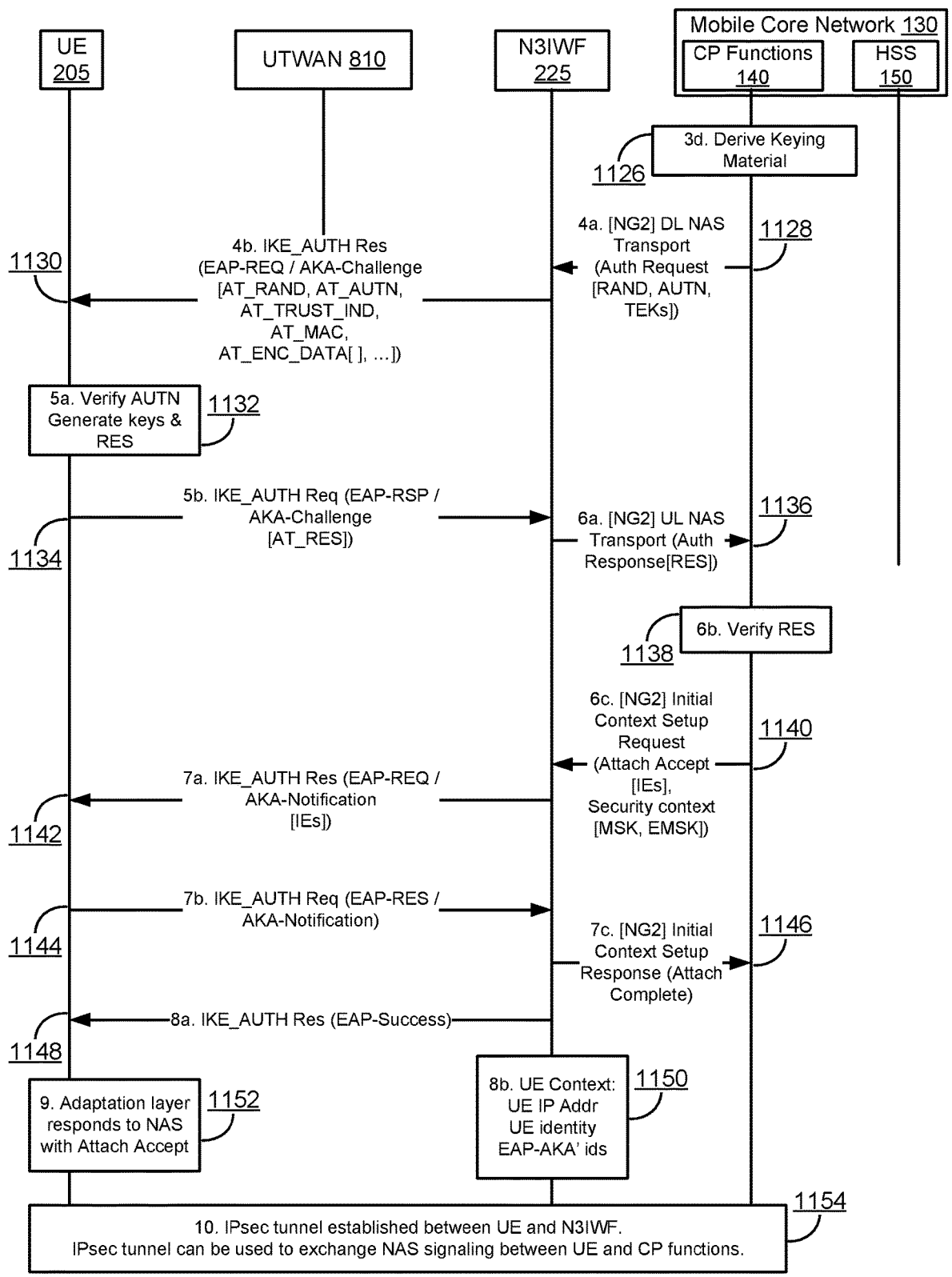
FIG. 11B continues the signaling procedure of FIG. 11A.

FIG. 11A-11B illustrate a signaling procedure 1100 for connecting to a mobile core network 130 via an untrusted WLAN access network 810. The signaling procedure 1100 depicts actions performed by and communications among the UE 205, the UTWAN 810, the N3IWF 225, and the mobile core network 130. The UE 205, the UTWAN 810, the N3IWF 225, and the mobile core network 130 are substantially as described above with reference to FIGS. 1-2 and 8-9. The signaling procedure 1100 depicts how the UE 205 connects to the UTWAN 810 and then establishes an IPsec connection to N3IWF 225 which is authenticated by and attached to the mobile core network 130 (via the NG2 interface). In some embodiments, the N3IWF 225 communicates with a single control plane function of the CP functions 140 when attaching and authenticating the UE 205. In other embodiments, the N3IWF 225 communicates with a plurality of functions of the CP functions 140 when attaching and authenticating the UE 205. The IPsec connection may later be used to exchange NAS signaling messages between the UE 205 and the CP functions 140 in the mobile core network 130.

At 1102, the UE 205 discovers and associates with the UTWAN 810 according to existing procedures. Where needed, the UE 205 is authenticated by the UTWAN 810 at 1104. This authentication is not a 3GPP-based authentication because the UTWAN 810 is not a trusted non-3GPP access network and it may not support 3GPP-based authentication. The UE 205 may use any non-3GPP method to authenticate and connect with the UTWAN 810. For example, the UE 205 may connect to the UTWAN 810 without authentication in the case of open (free) WLAN as an example, the UE 205 may authenticate with the UTWAN 810 via EAP with the pre-shared key, using a username/password combination, and the like.

At 1106, the UE 205 is connected to the UTWAN 810 and can establish layer 3 connectivity, for example by receiving an IP address via Dynamic Host Configuration Protocol ("DHCP"). At 1108, the UE 205 needs to discover the idea IP address of the N3IWF 255. Here, UE 205 may perform an ePDG discovery procedure (e.g., as specified in 3GPP TS 23.402) in order to discover the N3IWF 225.

At 1110, the NAS layer 613 sends an attach request to the adaptation layer 611. In response to the attach request, the adaptation layer 611 initiate the establishment of a secure IPsec tunnel between the UE 205 and the N3IWF 225. The adaptation layer 611 does not forward the attach request received from the NAS layer 613. Rather, the adaptation layer 611 initiates IKEv2 procedures to establish the secure IPsec tunnel.

At 1112, the UE 205 and the N3IWF 225 exchange security association initiation messages (here "IKE_SA_INIT" messages). At 1114, the UE 205 sends an IKEv2 authentication request message (here an "IKE_AUTH Request" message) to the N3IWF 225. Here, the authentication request may include an identity of the UE 205. However, at 1116, the N3IWF 225 sends a EAP-AKA' identity request to the UE 205 within the IKEv2 signaling (here embedded in an "IKE_AUTH Response" message). As discussed above with reference to FIG. 10a, the N3IWF 225 may request a specific identity from the UE 205.

At 1118, the UE 205 sends an EAP-AKA' identity response to the N3IWF 225 which contains the subscriber identity of the UE 205 (e.g., an IMSI). Optionally, the EAP-AKA' identity response may also include slice selection information, for example as a decorated identity or as a separate attribute, as discussed above with reference to FIG. 10A. Note that the UE 205 embeds the EAP-AKA' identity response within an IKEv2 authentication request message. At 1120, the N3IWF 225 performs network slice selection based on the slice selection information.

At 1122, the attach proxy 615 in the N3IWF 225 creates an initial UE message containing an attach request message on behalf of the UE 205. Note here that this is a separate attach request message than that generated by the NAS layer 613 at 1110. However, it includes the same subscriber identity as the subscriber identity in the attach request at 1110. The attach proxy 615 creates the new attach request message on behalf of the UE 205 in response to the EAP-AKA' identity response message. The attach request message is used to authenticate the UE 205 and authorize the establishment of the IPsec tunnel to N3IWF 225.

The attach request message includes the received subscriber identity of the UE 205. The attach request message also includes a "type" information element (IE) indicating that the attachment is over an untrusted non-3GPP access network (e.g., the UTWAN 810). The attach request message may further include the identity (e.g., ESSID) of the UTWAN 810. In certain embodiments, the attach request message omits information elements specific to 3GPP (RAN) access, such as old location area identity ("LAI"), UE network capabilities, discontinuous reception ("DRX") parameters, and the like.

At 1124, the mobile core network 130 obtains authentication vectors. Here, the CP functions 140 consult with the HSS 150 to obtain the authentication vectors. At 1126, the CP functions 140 of the mobile core network 130 derive keying material.

Referring now to FIG. 11B, the CP functions 140 send a DL NAS transport message containing an authentication request to the N3IWF 225 over the NG2 interface at 1128. The authentication request is part of the 3GPP attach procedure and includes a random value ("RAND"), an authentication parameter ("AUTN"), and a plurality of transient EAP keys ("TEKs"). Specifically, the N3IWF 225 receives authentication key ("K_aut") and encryption key ("K_encr") TEKs which are used to protect the EAP-AKA' signaling between the UE 205 and N3IWF 225. In certain embodiments, the TEKs keys are included in the Authentication Request only when the type IE in the Attach Request indicates non-3GPP access.

At 1130, the N3IWF 225 sends an EAP-AKA' authentication message (here an EAP-REQ/AKA-Challenge message) to UE 205. Note that the EAP-AKA' authentication message is embedded within the IKEv2 signaling (here an IKE authentication response message). The RAND and AUTN parameters received at 1128 are included in this message. Also, the EAP-AKA' authentication message includes a message authentication code attribute ("AT_MAC") calculated based on the K_aut key received at 1128. If there is need to send encrypted parameters to the UE 205 (e.g., inside a AT_ENCR_DATA attribute), these parameters are encrypted based on the K_encr key received at 1128.

At 1132, the UE 205 verifies the AUTN, generates the session keys (e.g., a master session key ("MSK"), an extended master session key ("EMSK"), the K_aut key, the K_encr key, etc.) and derives a result (RES) to the EAP-AKA' authentication message (e.g., the EAP-REQ/AKA-Challenge message) containing a result attribute ("AT_RES"). At 1134 the UE 205 sends an EAP-AKA' authentication response (here an EAP-REQ/AKA-Challenge response) to the N3IWF 225. Note that the EAP-AKA' authentication response is embedded within the IKEv2 signaling (here an IKE authentication request message). At 1136, the N3IWF derives a 3GPP Authentication Response message containing the result (RES) received from the EAP-AKA' response. The N3IWF 225 also sends the 3GPP Authentication Response message to the CP functions 140 over NG2.

At 1138, the CP functions 140 verify the result (RES). If the result (RES) is correct, the CP functions 140 respond with an Attach Accept message at 1140 (shown embedded in a "Initial Context Setup Request" message). This Attach Accept message may include parameters (referred to as IEs in FIG. 10B) to be transferred to the UE 205. For example, the Attach Accept message may include a temporary UE identity. Additionally, the Initial Context Setup Request message may include security context containing the session keys (e.g., MSK, EMSK) previously derived by the UE 205 and which are needed to protect the WLAN air interface traffic.

At 1142, the N3IWF 225 sends an EAP-AKA' notification message (here a EAP-REQ/AKA-Notification message embedded within a IKEv2 authentication response) to the UE 205 which includes the parameters (IEs) that were included in the Attach Accept message (e.g., a new temporary identity). Note that a legacy UE 205 will ignore the other parameters (IEs).

At 1144, the UE 205 responds with an EAP-AKA' notification response (here an EAP-RES/AKA-Notification embedded within a IKEv2 authentication request) which triggers the N3IWF 225 to send an Attach Complete message to CP functions 140 at 1146. At 1148, the EAP-AKA' authentication procedure completes with an EAP-Success message.

At 1150, the N3IWF 225 creates a UE Context which stores information such as the UE IP address, the UE temporary identity (included in the Attach Accept message), the EAP-AKA' identities of the UE 205 (e.g. a pseudonym and/or fast re-authentication identities), and the like. At this point, the adaptation layer 611 in the UE 205 responds to the NAS layer 613 with the Attach Accept message. At this point, an IPsec tunnel is established between the UE 205 and N3IWF 225. At 1154, the IPsec tunnel is used exchange NAS signaling between the UE 205 in the CP functions 140.

Figure 12:
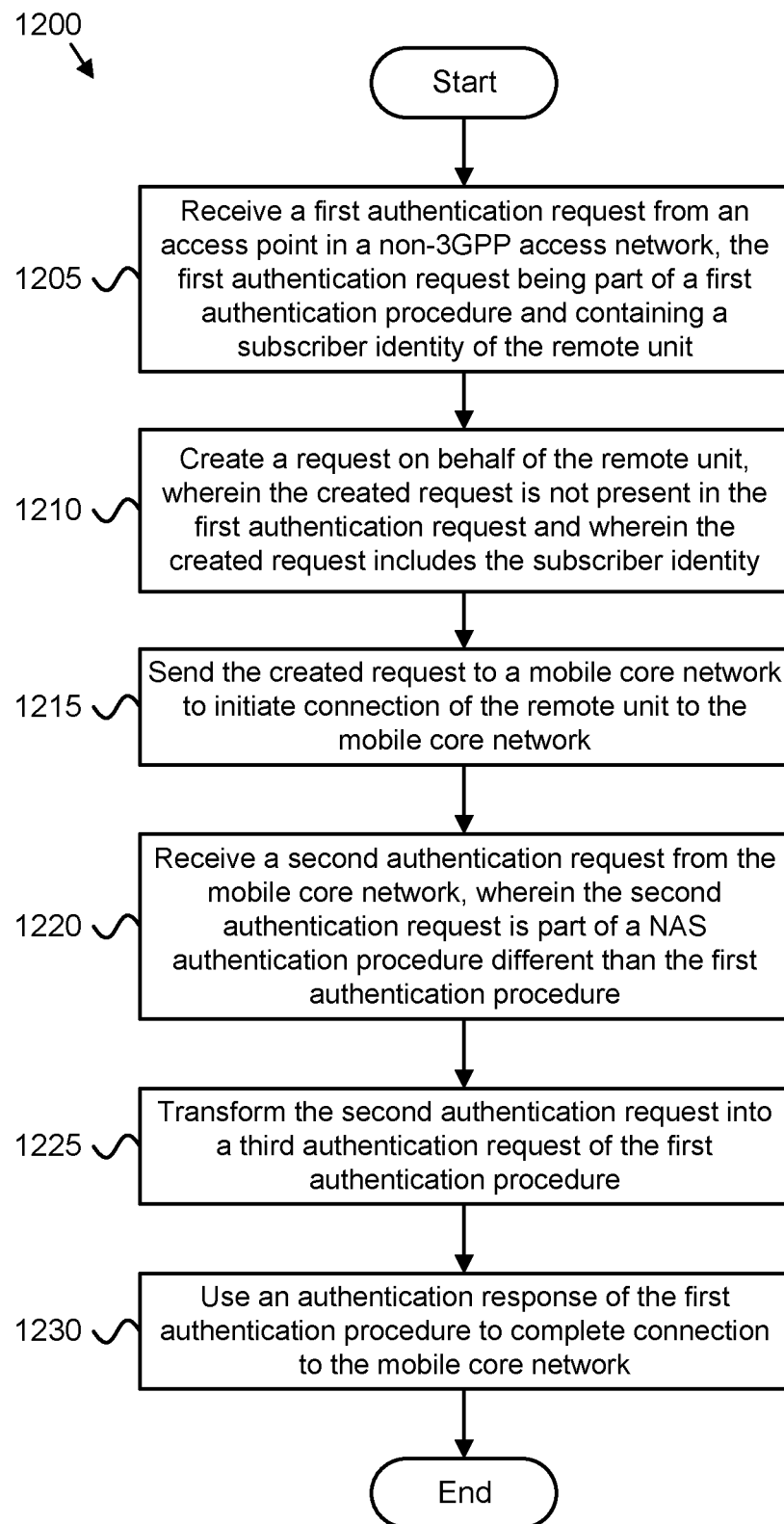
FIG. 12 is a flow chart diagram illustrating another embodiment of a method for connecting a remote unit to a mobile core network via a non-3GPP access network using an interworking entity.

FIG. 12 depicts a method 1200 for connecting a remote unit to a mobile core network via a non-3GPP access network, according to embodiments of the disclosure. In some embodiments, the method 1200 is performed by an interworking function, such as the interworking entity 135 and/or the N3IWF 225. In certain embodiments, the method 1200 may be performed by a processor executing program code, for example, a microcontroller, a microprocessor, a CPU, a GPU, an auxiliary processing unit, a FPGA, or the like.

The method 1200 begins and receives 1205, at the interworking entity, a first authentication request from an access point in a non-3GPP access network, the first authentication request being part of a first authentication procedure and containing a subscriber identity of the remote unit. The method 1200 includes creating 1210, by the interworking entity, a request on behalf of the remote unit, wherein the created request is not present in the first authentication request and wherein the created request includes the subscriber identity.

The method 1200 includes sending 1215, by the interworking entity, the created request to a mobile core network to initiate connection of the remote unit to the mobile core network. The method 1200 includes receiving 1220, at an interworking entity, a second authentication request from the mobile core network, wherein the second authentication request is part of a NAS authentication procedure different than the first authentication procedure.

The method 1200 includes transforming 1225, by the interworking entity, the second authentication request into a third authentication request of the first authentication procedure. The method 1200 includes using 1230, by the interworking entity, an authentication response of the first authentication procedure to complete connection to the mobile core network Disclosed herein is a first apparatus for connecting a remote unit to a mobile core network via a non-3GPP access network, according to embodiments of the disclosure. The first apparatus may be implemented by an interworking function, such as the interworking entity 135 and/or the N3IWF 225. The first apparatus includes a processor, a first network interface that communicates with a remote unit over a non-3GPP access network, and a second network interface that communicates with a mobile core network. The processor initiates a first authentication procedure with the remote unit over the non-3GPP access network and sends an attach request to the mobile core network on behalf of the remote unit. The processor receives an attachment authentication request from the mobile core network and transforms the attachment authentication request into authentication request of the first authentication procedure. The processor uses an authentication response of the first authentication procedure to complete attachment to the mobile core network.

In some embodiments, the processor initiates the first authentication procedure by requesting a subscriber identity of the remote unit. In certain embodiments, the processor further receives a subscriber identity response containing the subscriber identity and slice selection information. Here, the processor sends the attach request to a particular network slice in the mobile core network based on the slice selection information, the mobile core network including at least two network slices. In further embodiments, the subscriber identity response contains a decorated identity, the decorated identity combining the subscriber identity and the slice selection information into a single value.

In certain embodiments, the attach request includes the subscriber identity and indicates an attachment over the non-3GPP access network. In further embodiments, the attach request includes an identity of the non-3GPP access network.

In some embodiments, the non-3GPP access network is a trusted WLAN containing at least one WLAN access point and the apparatus. In some embodiments, the attachment authentication request includes transient security keys for protecting messages of the first authentication communicated between the remote unit and the apparatus. In some embodiments, sending an attach request to the mobile core network on behalf of the remote unit includes sending the attach request to a control plane function of the mobile core network.

In some embodiments, the processor further creates a security key in response to completing attachment to the mobile core network. In certain embodiments, the processor further establishes a secure connection with the remote unit in response to completing attachment to the mobile core network, wherein the secure connection is established by using the security key.

In certain embodiments, the secure connection is a DTLS connection and the security key is used as a pre-shared key to establish the DTLS connection. In further embodiments, the processor relays Non-Access Stratum messages between the remote unit and the mobile core network in response to establishing the secure connection.

In some embodiments, the first authentication procedure is an EAP-AKA' procedure. In certain embodiments, the non-3GPP access network is an untrusted wireless local area network and wherein the EAP-AKA' procedure is embedded into an IKEv2 procedure. In certain embodiments, the authentication request of the first authentication procedure is an EAP-AKA' challenge message and the authentication response of the first authentication procedure is a EAP-AKA' challenge response, wherein using an authentication response of the first authentication procedure to complete attachment to the mobile core network includes the processor generating an attachment authentication response using the EAP-AKA' challenge response and sending the attachment authentication response to a control plane function of the mobile core network.

In certain embodiments, the processor further receives an attach accept message from the mobile core network in response to the attachment authentication response and security keys for protecting user traffic over the non-3GPP access network. In certain embodiments, the processor further sends a EAP-AKA' notification to the remote unit, the EAP-AKA' notification including a network address of the apparatus.

In some embodiments, the processor further generates a remote unit context in response to completing attachment to the mobile core network, the remote unit context including a network address of the remote unit, a subscriber identity of the remote unit, and one or more EAP-AKA' identities of the remote unit.

Disclosed herein is a first method for connecting a remote unit to a mobile core network via a non-3GPP access network, according to embodiments of the disclosure. The first method may be performed by an interworking function, such as the interworking entity 135 and/or the N3IWF 225. The first method includes initiating, at the interworking entity, a first authentication procedure with a remote unit over a non-3GPP access network and sending, by the interworking entity, an attach request to a mobile core network on behalf of the remote unit. The first method includes receiving, at the interworking entity, an attachment authentication request from the mobile core network and transforming, by the interworking entity, the attachment authentication request into an authentication request of the first authentication procedure. The first method includes using, by the interworking entity, an authentication response of the first authentication procedure to complete attachment to the mobile core network.

In some embodiments, initiating the first authentication procedure includes the interworking entity requesting a subscriber identity of the remote unit. In some embodiments, the first method further includes the interworking entity receiving a subscriber identity response containing the subscriber identity and slice selection information, wherein sending an attach request to the mobile core network on behalf of the remote unit includes the interworking entity sending the attach request to a particular network slice in the mobile core network based on the slice selection information, the mobile core network including at least two network slices.

In certain embodiments, the subscriber identity response contains a decorated identity, the decorated identity combining the subscriber identity and the slice selection information into a single value. In certain embodiments, the attach request includes the subscriber identity and indicates an attachment over the non-3GPP access network. In one embodiment, the attach request further includes an identity of the non-3GPP access network.

In certain embodiments, the non-3GPP access network is a trusted WLAN containing at least one WLAN access point and the interworking entity. In some embodiments, the attachment authentication request includes transient security keys for protecting messages of the first authentication procedure communicated between the remote unit and the interworking entity. In some embodiments, sending an attach request to the mobile core network on behalf of the remote unit includes the interworking entity sending the attach request to a control plane function of the mobile core network.

In some embodiments, the first method further includes the interworking entity creating a security key in response to completing attachment to the mobile core network. In certain embodiments, the first method also includes the interworking entity establishing a secure connection with the remote unit in response to completing attachment to the mobile core network, wherein the secure connection is established using the security key.

In certain embodiments, the secure connection is a DTLS connection and the security key is used as a pre-shared key to establish the DTLS connection. In certain embodiments, the first method further includes the interworking entity relaying NAS messages between the remote unit and the mobile core network in response to establishing the secure connection. In some embodiments, the first authentication procedure is an EAP-AKA' procedure. In certain embodiments, the non-3GPP access network is an untrusted wireless local area network and wherein the EAP-AKA' procedure is embedded into an IKEv2 procedure.

In certain embodiments, the authentication request of the first authentication procedure is an EAP-AKA' challenge message and the authentication response of the first authentication procedure is a EAP-AKA' challenge response, wherein using an authentication response of the first authentication procedure to complete attachment to the mobile core network includes the interworking entity generating an attachment authentication response using the EAP-AKA' challenge response and sending the attachment authentication response to a control plane function of the mobile core network.

In certain embodiments, the first method may include the interworking entity receiving an attach accept message from the mobile core network in response to the attachment authentication response and security keys for protecting user traffic over the non-3GPP access network. In certain embodiments, the first method may include the interworking entity sending a EAP-AKA' notification to the remote unit, the EAP-AKA' notification including a network address of the interworking entity.

In some embodiments, the first method includes the interworking entity generating a remote unit context in response to completing attachment to the mobile core network, the remote unit context including a network address of the remote unit, a subscriber identity of the remote unit, and one or more EAP-AKA' identities of the remote unit.

Disclosed herein is a second apparatus for connecting a remote unit to a mobile core network via a non-3GPP access network, according to embodiments of the disclosure. The second apparatus may be implemented by an interworking function, such as the interworking entity 135 and/or the N3IWF 225. The second apparatus includes a processor, a first network interface that communicates towards a remote unit over a non-3GPP access network, and a second network interface that communicates with a mobile core network. The processor receives a first authentication request from an access point in the non-3GPP access network and containing a subscriber identity of the remote unit and creates a request on behalf of the remote unit. Here, the first authentication request is part of a first authentication procedure, where the created request is not present in the first authentication request and where the created request includes the subscriber identity. The processor sends the created request to the mobile core network to initiate connection of the remote unit to the mobile core network and receives a second authentication request from the mobile core network, where the second authentication request is part of a NAS authentication procedure different than the first authentication procedure. The processor transforms the second authentication request into a third authentication request of the first authentication procedure and uses an authentication response of the first authentication procedure to complete connection of the remote unit to the mobile core network.

In some embodiments, the first authentication request contains slice selection information, where the processor sends the created request to a particular network slice in the mobile core network based on the slice selection information, the mobile core network including at least two network slices. In some embodiments, where the first authentication request contains a decorated identity, the decorated identity including the subscriber identity and the slice selection information.

In some embodiments, the access point is a WLAN access point, wherein the non-3GPP access network is a trusted WLAN containing at least the WLAN access point and the apparatus. In some embodiments, the processor further creates a master key in response to completing connection to the mobile core network, wherein the master key is used to secure the communication between the remote unit and the access point. In some embodiments, the first authentication procedure is an EAP-AKA' procedure.

In some embodiments, the first authentication request of the first authentication procedure is an EAP-Response identity message including the subscriber identity, wherein the second authentication request from the mobile core network is a NAS authentication request message, wherein the third authentication request of the first authentication procedure includes an EAP-AKA' challenge request, and wherein the authentication response of the first authentication procedure includes an EAP-AKA' challenge response.

In certain embodiments, using an authentication response of the first authentication procedure to complete connection to the mobile core network includes the processor generating a NAS authentication response using the EAP-AKA' challenge response message and sending the NAS authentication response to a control plane function of the mobile core network. In certain embodiments, the processor further receives an accept message from the mobile core network in response to sending the NAS authentication response to a control plane function of the mobile core network. In certain embodiments, the processor transforms the second authentication request into a third authentication request of the first authentication procedure includes creating the EAP-AKA' challenge request using the information contained in the NAS authentication request.

Disclosed herein is a second method for connecting a remote unit to a mobile core network via a non-3GPP access network, according to embodiments of the disclosure. The second method may be performed by an interworking function, such as the interworking entity 135 and/or the N3IWF 225. The second method includes receiving, at the interworking entity, a first authentication request from an access point in a non-3GPP access network, the first authentication request being part of a first authentication procedure and containing a subscriber identity of the remote unit. The second method includes creating, by the interworking entity, a request on behalf of the remote unit, wherein the created request is not present in the first authentication request and wherein the created request includes the subscriber identity. The second method includes sending, by the interworking entity, the created request to a mobile core network to initiate connection of the remote unit to the mobile core network. The second method includes receiving, at an interworking entity, a second authentication request from the mobile core network, wherein the second authentication request is part of a NAS authentication procedure different than the first authentication procedure. The second method includes transforming, by the interworking entity, the second authentication request into a third authentication request of the first authentication procedure. The second method includes using, by the interworking entity, an authentication response of the first authentication procedure to complete connection to the mobile core network.

In some embodiments of the second method, the first authentication request contains slice selection information, wherein sending the created request to the mobile core network on behalf of the remote unit includes the interworking entity sending the request to a particular network slice in the mobile core network based on the slice selection information, the mobile core network including at least two network slices. In some embodiments of the second method, the first authentication request contains a decorated identity, the decorated identity including the subscriber identity and the slice selection information.

In some embodiments of the second method, the access point is a WLAN access point, wherein the non-3GPP access network is a trusted WLAN containing at least the WLAN access point and the interworking entity. In some embodiments, the second method further including the interworking entity creating a master key in response to completing connection to the mobile core network, wherein the master key is used to secure the communication between the remote unit and the access point. In some embodiments of the second method, the first authentication procedure is an EAP-AKA' procedure.

In some embodiments of the second method, the first authentication request of the first authentication procedure is an EAP-Response identity challenge message including the subscriber identity, wherein second authentication request from the mobile core network is a NAS authentication request message, wherein the third authentication request of the first authentication procedure includes an EAP-AKA' challenge request, and wherein the authentication response of the first authentication procedure includes an EAP-AKA' challenge response.

In certain embodiments, using an authentication response of the first authentication procedure to complete connection to the mobile core network includes the interworking entity generating a NAS authentication response using the EAP-AKA' challenge response message and sending the NAS authentication response to a control plane function of the mobile core network. In certain embodiments, the second method further includes the interworking entity receiving an accept message from the mobile core network in response to sending the NAS authentication response to a control plane function of the mobile core network.

In certain embodiments of the second method, transforming the second authentication request into a third authentication request of the first authentication procedure includes creating the EAP-AKA' challenge request using the information contained in the NAS authentication request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a first network interface that communicates towards a remote unit over a non-Third Generation Partnership Project ("non-3GPP") access network;
a second network interface that communicates with a mobile core network;
a processor that:
receives a first authentication request from an access point in the non-3GPP access network, the first authentication request being part of a first authentication procedure and containing a subscriber identity of the remote unit;
creates a request on behalf of the remote unit, wherein the created request is not present in the first authentication request and wherein the created request includes the subscriber identity;
sends the created request to the mobile core network to initiate connection of the remote unit to the mobile core network;
receives a second authentication request from the mobile core network, wherein the second authentication request is part of a Non-Access Stratum ("NAS") authentication procedure different than the first authentication procedure;
transforms the second authentication request into a third authentication request of the first authentication procedure; and
uses an authentication response of the first authentication procedure to complete connection of the remote unit to the mobile core network.

2. The apparatus of claim 1, wherein the first authentication request comprises slice selection information, wherein the processor sends the created request to a particular network slice in the mobile core network based on the slice selection information, the mobile core network comprising at least two network slices.

3. The apparatus of claim 1, wherein the first authentication request contains a decorated identity, the decorated identity comprising the subscriber identity and slice selection information.

4. The apparatus of claim 1, wherein the access point is a wireless local area network ("WLAN") access point, wherein the non-3GPP access network is a trusted WLAN containing at least the WLAN access point and the apparatus.

5. The apparatus of claim 1, wherein the processor further creates a master key in response to completing connection to the mobile core network, wherein the master key is used to secure the communication between the remote unit and the access point.

6. The apparatus of claim 1, wherein the first authentication procedure is an Improved Extensible Authentication Protocol for 3rd Generation Authentication and Key Agreement ("EAP-AKA'") procedure.

7. The apparatus of claim 1, wherein the first authentication request of the first authentication procedure is an EAP-Response identity message including the subscriber identity, wherein the second authentication request from the mobile core network is a NAS authentication request message, wherein the third authentication request of the first authentication procedure comprises an EAP-AKA' challenge request, and wherein the authentication response of the first authentication procedure comprises an EAP-AKA' challenge response.

8. The apparatus of claim 7, wherein using an authentication response of the first authentication procedure to complete connection to the mobile core network comprises the processor generating a NAS authentication response using the EAP-AKA' challenge response message and sending the NAS authentication response to a control plane function of the mobile core network.

9. The apparatus of claim 7, wherein the processor further receives an accept message from the mobile core network in response to sending the NAS authentication response to a control plane function of the mobile core network.

10. The apparatus of claim 7, wherein the processor transforms the second authentication request into a third authentication request of the first authentication procedure comprises creating the EAP-AKA' challenge request using information contained in the NAS authentication request.

11. A method comprising:
receiving, at an interworking entity, a first authentication request from an access point in a non-3GPP access network, the first authentication request being part of a first authentication procedure and containing a subscriber identity of a remote unit;
creating, by the interworking entity, a request on behalf of the remote unit, wherein the created request is not present in the first authentication request and wherein the created request includes the subscriber identity;
sending, by the interworking entity, the created request to a mobile core network to initiate connection of the remote unit to the mobile core network;
receiving, at an interworking entity, a second authentication request from the mobile core network, wherein the second authentication request is part of a Non-Access Stratum ("NAS") authentication procedure different than the first authentication procedure;
transforming, by the interworking entity, the second authentication request into a third authentication request of the first authentication procedure; and
using, by the interworking entity, an authentication response of the first authentication procedure to complete connection to the mobile core network.

12. The method of claim 11, wherein the first authentication request comprises slice selection information, wherein sending the created request to the mobile core network on behalf of the remote unit comprises the interworking entity sending the request to a particular network slice in the mobile core network based on the slice selection information, the mobile core network comprising at least two network slices.

13. The method of claim 11, wherein the first authentication request contains a decorated identity, the decorated identity comprising the subscriber identity and slice selection information.

14. The method of claim 11, wherein the access point is a wireless local area network ("WLAN") access point, wherein the non-3GPP access network is a trusted WLAN containing at least the WLAN access point and the interworking entity.

15. The method of claim 11, further comprising the interworking entity creating a master key in response to completing connection to the mobile core network, wherein the master key is used to secure communication between the remote unit and the access point.

16. The method of claim 11, wherein the first authentication procedure is an Improved Extensible Authentication Protocol for 3rd Generation Authentication and Key Agreement ("EAP-AKA'") procedure.

17. The method of claim 11, wherein the first authentication request of the first authentication procedure is an EAP-Response identity challenge message including the subscriber identity, wherein second authentication request from the mobile core network is a NAS authentication request message, wherein the third authentication request of the first authentication procedure comprises an EAP-AKA' challenge request, and wherein the authentication response of the first authentication procedure comprises an EAP-AKA' challenge response.

18. The method of claim 17, wherein using an authentication response of the first authentication procedure to complete connection to the mobile core network comprises the interworking entity generating a NAS authentication response using the EAP-AKA' challenge response message and sending the NAS authentication response to a control plane function of the mobile core network.

19. The method of claim 17, further comprising the interworking entity receiving an accept message from the mobile core network in response to sending the NAS authentication response to a control plane function of the mobile core network.

20. The method of claim 17, wherein transforming the second authentication request into a third authentication request of the first authentication procedure comprises creating the EAP-AKA' challenge request using information contained in the NAS authentication request.

* * * * *